United States Patent
Gotoh et al.

(10) Patent No.: US 12,190,579 B2
(45) Date of Patent: Jan. 7, 2025

(54) IMAGE PROCESSING APPARATUS, IMAGE PROCESSING METHOD, AND PROGRAM

(71) Applicant: SONY GROUP CORPORATION, Tokyo (JP)

(72) Inventors: Tomohiko Gotoh, Kanagawa (JP); Hidenori Aoki, Chiba (JP); Fujio Arai, Tokyo (JP); Keijiroh Nagano, Tokyo (JP); Ryo Fukazawa, Kanagawa (JP); Haruka Fujisawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 394 days.

(21) Appl. No.: 17/628,736

(22) PCT Filed: Jul. 7, 2020

(86) PCT No.: PCT/JP2020/026611
§ 371 (c)(1),
(2) Date: Jan. 20, 2022

(87) PCT Pub. No.: WO2021/029164
PCT Pub. Date: Feb. 18, 2021

(65) Prior Publication Data
US 2022/0270363 A1 Aug. 25, 2022

(30) Foreign Application Priority Data
Aug. 9, 2019 (JP) .................. 2019-147046

(51) Int. Cl.
*G06V 20/20* (2022.01)
*G06F 3/16* (2006.01)
(Continued)

(52) U.S. Cl.
CPC ............. *G06V 20/20* (2022.01); *G06F 3/16* (2013.01); *G06T 7/11* (2017.01); *G06T 7/194* (2017.01); *G06T 19/006* (2013.01)

(58) Field of Classification Search
CPC .......... G06V 20/20; G06T 7/194; G06T 7/11; G06T 19/006; G06F 3/16
(Continued)

(56) References Cited

U.S. PATENT DOCUMENTS 7,774,158 B2 * 8/2010 Domingues Goncalves ............... G05D 1/024
701/28
9,679,547 B1 * 6/2017 Zünd ...................... A63F 13/25
(Continued)

FOREIGN PATENT DOCUMENTS

| JP | 2014-206904 A | 10/2014 |
| JP | 2015-060579 A | 3/2015 |

(Continued)

*Primary Examiner* — William D Titcomb
(74) *Attorney, Agent, or Firm* — Paratus Law Group, PLLC

(57) ABSTRACT

Provided are an apparatus and a method that performs selection or display mode change of a virtual object to be displayed depending on a real object type in a target area to be a display area for the virtual object. Included are an object identification unit that executes identification processing of a real object in the real world, and a content display control unit that generates an AR image in which a real object and a virtual object are superimposed and displayed. The object identification unit identifies a real object in the target area to be the display area for the virtual object, and the content display control unit performs processing of selecting the virtual object to be displayed or processing of changing the display mode depending on the object identification result.

15 Claims, 18 Drawing Sheets

(51) Int. Cl.
*G06T 7/11* (2017.01)
*G06T 7/194* (2017.01)
*G06T 19/00* (2011.01)

(58) Field of Classification Search
USPC .......................................................... 382/103
See application file for complete search history.

(56) References Cited

U.S. PATENT DOCUMENTS

| | | | |
|---|---|---|---|
| 10,565,452 B2* | 2/2020 | Rad ........................ | G09B 5/065 |
| 10,909,405 B1* | 2/2021 | Golard .................. | G06V 10/764 |
| 11,150,777 B2* | 10/2021 | Kaehler ................. | G06V 20/20 |
| 2004/0168148 A1* | 8/2004 | Goncalves ........... | G05D 1/0231 |
| | | | 717/104 |
| 2012/0105473 A1* | 5/2012 | Bar-Zeev .................. | G06T 1/20 |
| | | | 345/633 |
| 2012/0206452 A1 | 8/2012 | Geisner | |
| 2013/0278635 A1* | 10/2013 | Maggiore ............. | G06F 3/0304 |
| | | | 345/633 |
| 2014/0168261 A1* | 6/2014 | Margolis .............. | H04N 13/344 |
| | | | 345/633 |
| 2015/0265930 A1* | 9/2015 | Chrzanowski, Jr. ..... | A63F 13/10 |
| | | | 463/35 |
| 2017/0193710 A1* | 7/2017 | Kumar .................... | G06F 3/012 |
| 2017/0287456 A1* | 10/2017 | Zund ....................... | A63F 13/92 |
| 2018/0157398 A1* | 6/2018 | Kaehler ................ | G06V 10/464 |
| 2019/0094389 A1* | 3/2019 | Li ............................ | G06N 3/08 |
| 2019/0094981 A1 | 3/2019 | Bradski | |
| 2019/0108578 A1* | 4/2019 | Spivack ................. | G09B 5/065 |
| 2022/0277166 A1* | 9/2022 | Zou ........................ | G06V 20/20 |
| 2023/0315250 A1* | 10/2023 | Kaehler ................. | G06N 20/00 |
| | | | 715/848 |

FOREIGN PATENT DOCUMENTS

| | | |
|---|---|---|
| JP | 2015-207291 A | 11/2015 |
| JP | 2017-049658 A | 3/2017 |
| JP | 2017-091433 A | 5/2017 |
| JP | 2019-012537 A | 1/2019 |
| KR | 20130122836 A | 11/2013 |
| KR | 20190027930 A | 3/2019 |
| WO | WO 2018/106542 A1 | 6/2018 |
| WO | WO 2019/016870 A1 | 1/2019 |

* cited by examiner

FIG. 4
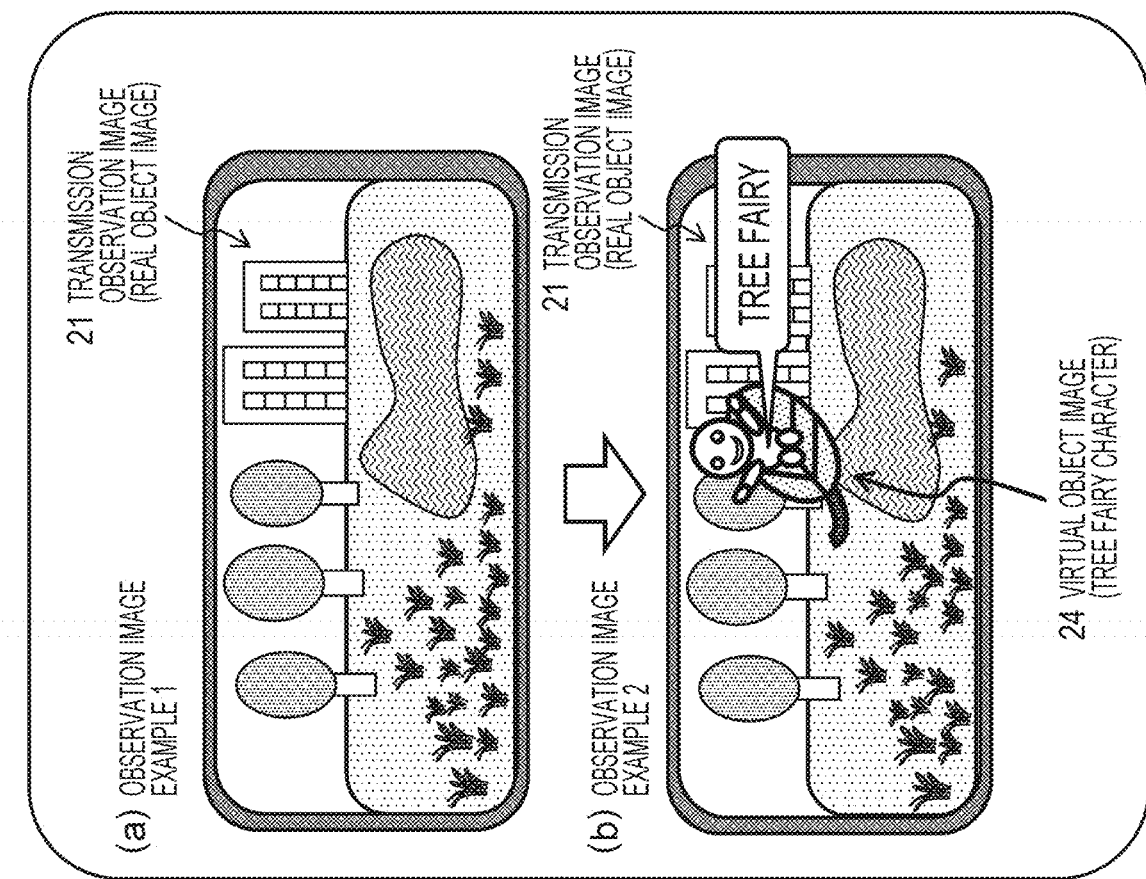
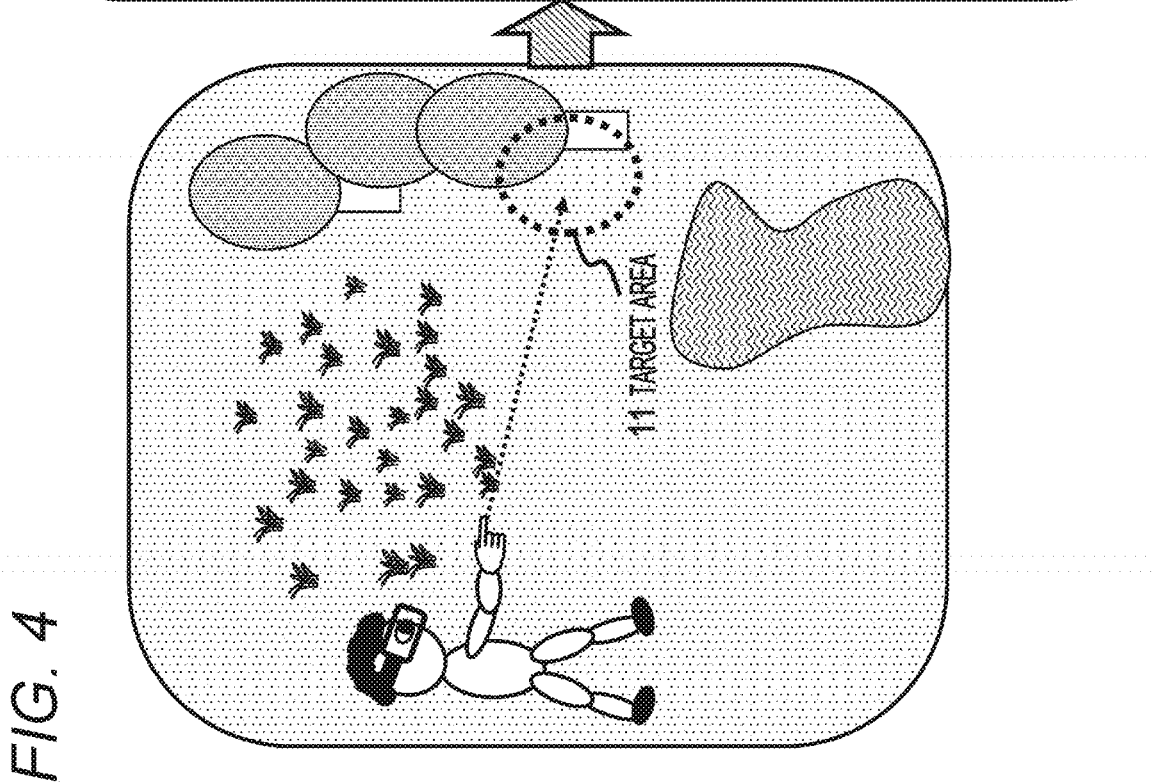

FIG. 8
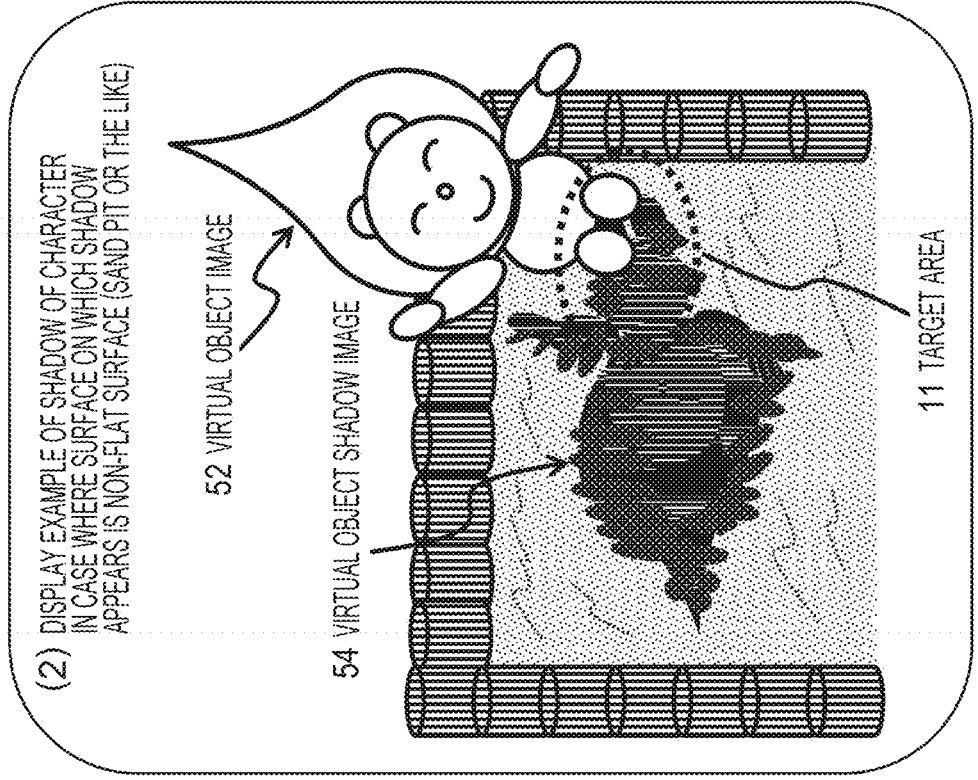
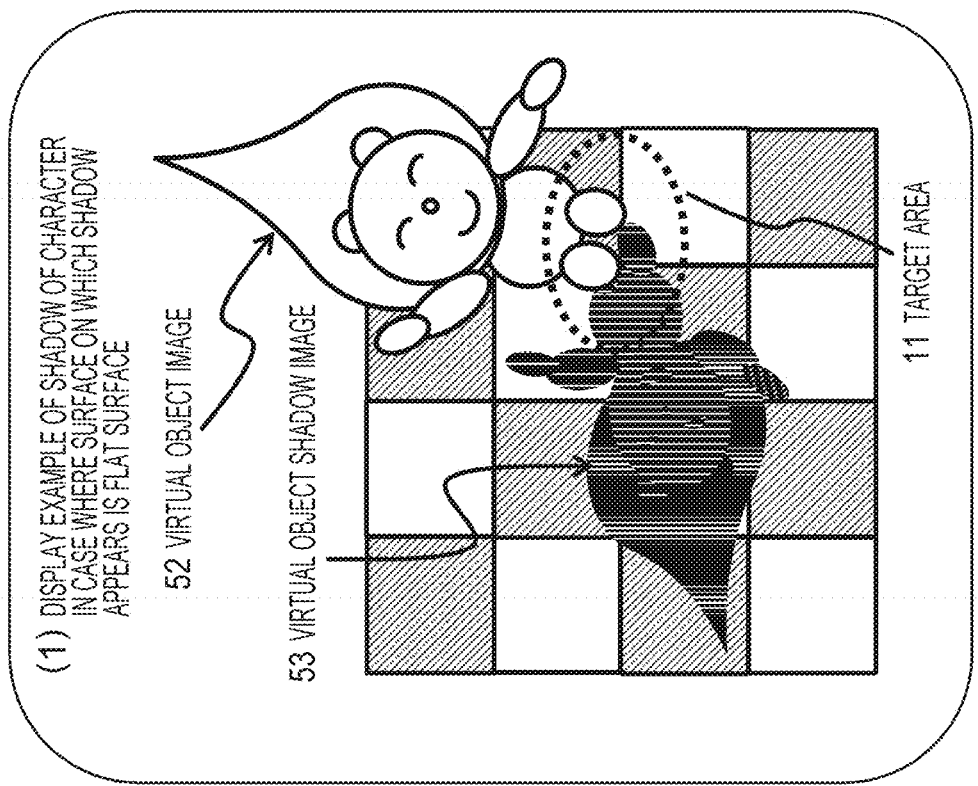

FIG. 10

| (a) TIME STAMP (sec) | (b) POSITION INFORMATION | (c) CLASS | (d) ELAPSED TIME AFTER IDENTIFICATION PROCESSING (sec) |
|---|---|---|---|
| 10839948 | v1355,3356,28<br>v1232,3460,31<br>v1344,3577,32<br>v1234,3456,34 | LAWN | 183 |
| 10839950 | v890,3351,24<br>v912,3090,22<br>v1093,1333,30<br>v1332,3912,18 | ASPHALT | 3511 |
| 10839958 | v2239,113,12<br>v2562,3567,14<br>v334,134,11<br>v113,3835,12 | WATER SURFACE | 452 |
| 10839960 | v1678,843,31<br>v879,311,32<br>v1589,309,30<br>v865,890,29 | SHADOW | 3 |
| ... | ... | ... | ... |

FIG. 11

| (a) ID | (b) CATEGORY | (c) CLASS | (d) UPDATE TIME (sec) |
|---|---|---|---|
| 001 | ENVIRONMENT | LAWN | 3600 |
| 002 | ENVIRONMENT | ASPHALT | 3600 |
| 003 | ENVIRONMENT | WATER SURFACE | 600 |
| 004 | PHENOMENON | SHADOW | 2 |
| 005 | PHENOMENON | GROUND SURFACE COVERED WITH FALLEN LEAVES | 120 |
| ... | ... | ... | ... |

FIG. 12
| (a) CLASS | (b) VIRTUAL OBJECT 3D MODEL (CHARACTER 3D MODEL) | (c) OUTPUT SOUND | |
|---|---|---|---|
| POND | 0000123 ( 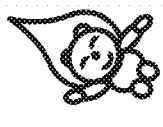 ) | SOUND DATA OF WATER SOUND | ... |
| LAWN | 0023459 (  ) | SOUND DATA OF GRASS SOUND | ... |
| TREE | 0314562 ( 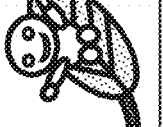 ) | SOUND DATA OF LEAF SOUND | ... |
| ... | ... | ... | ... |

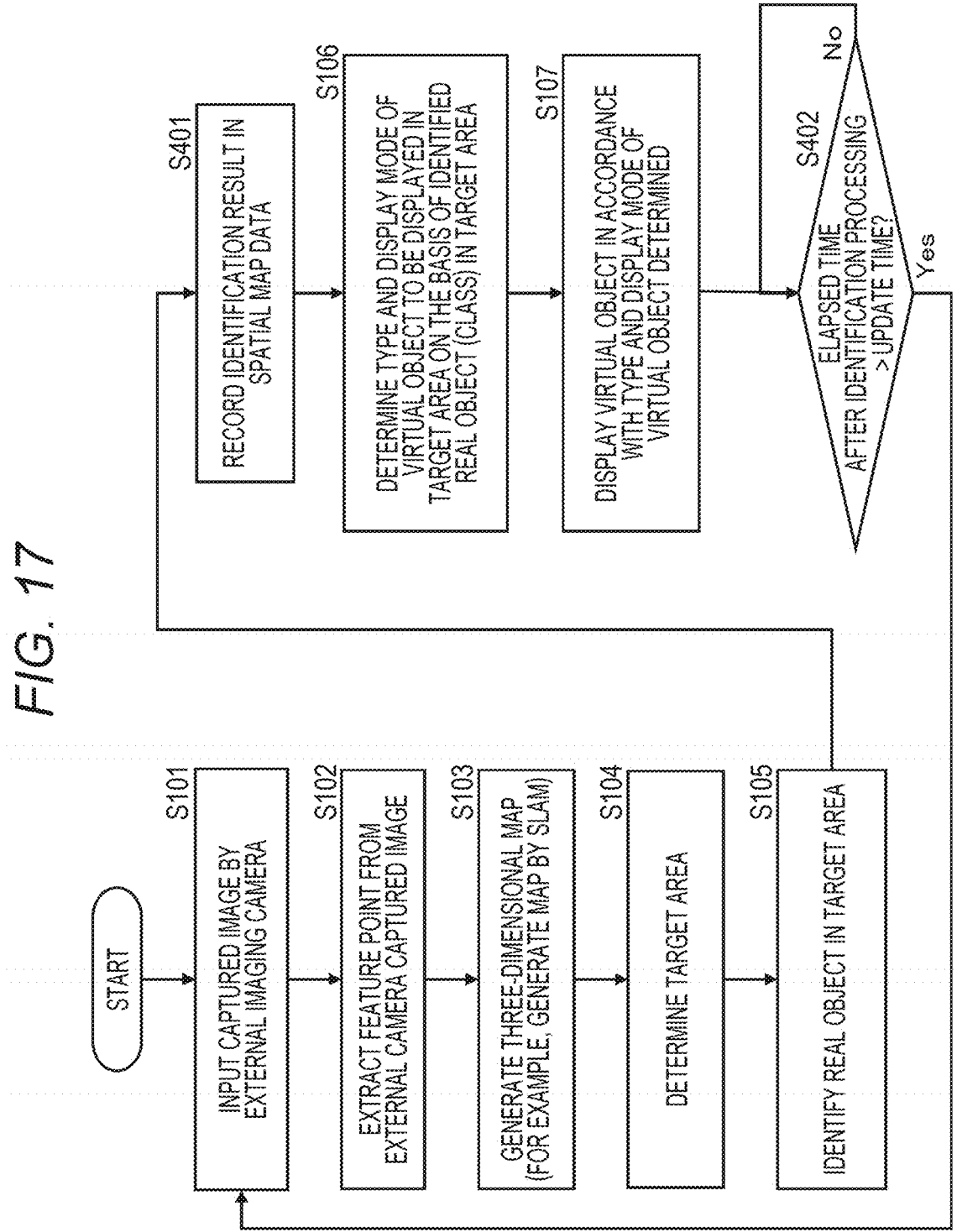

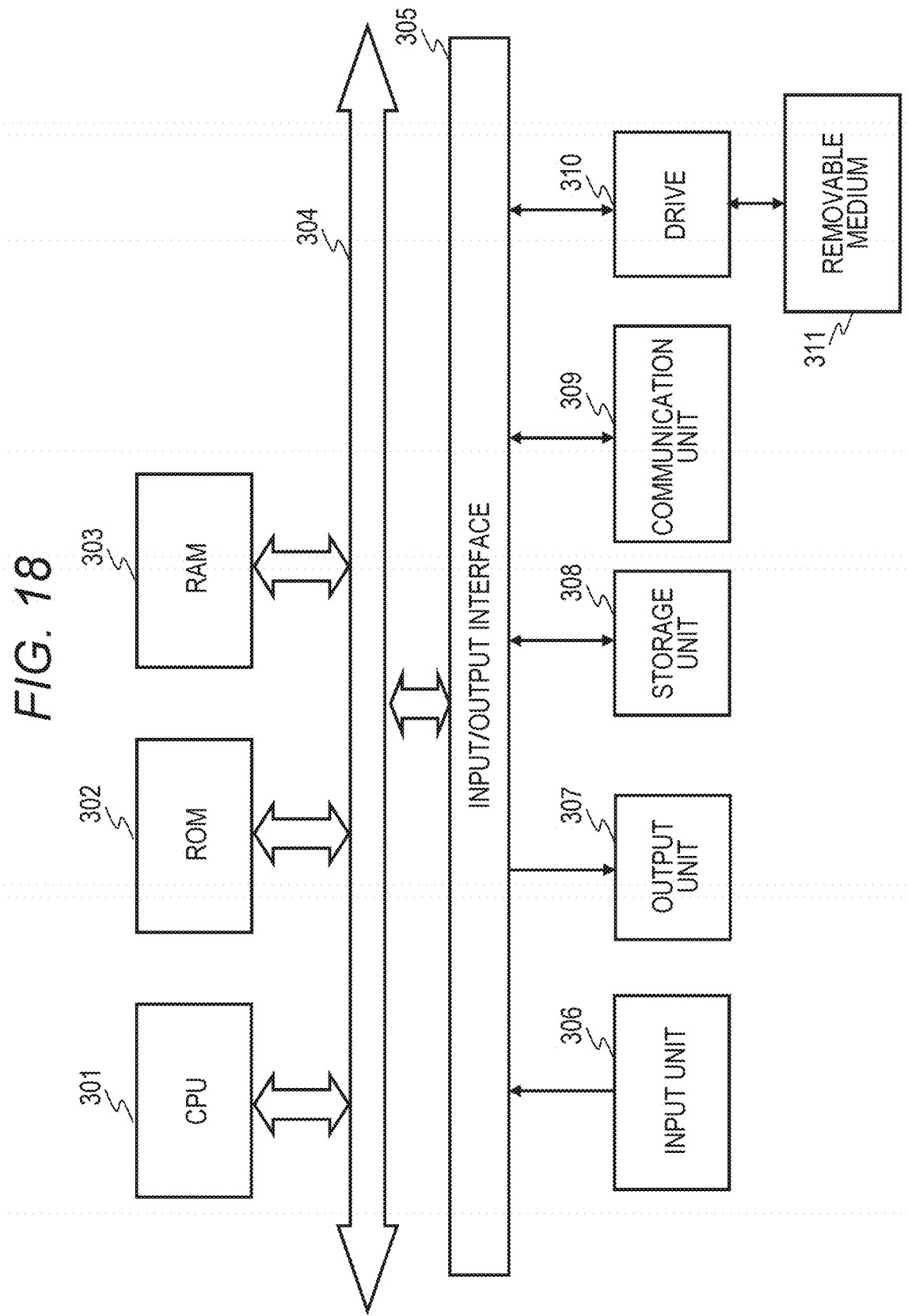

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2020/026611 (filed on Jul. 7, 2020) under 35 U.S.C. § 371, which claims priority to Japanese Patent Application No. 2019-147046 (filed on Aug. 9, 2019), which are all hereby incorporated by reference in their entirety.

TECHNICAL FIELD

The present disclosure relates to an image processing apparatus, an image processing method, and a program. More specifically, the present disclosure relates to an image processing apparatus, an image processing method, and a program that generate and output an augmented reality (AR) image in which a virtual content such as a character image is superimposed and displayed on a real object that can be actually observed.

BACKGROUND ART

An image in which a virtual object is superimposed and displayed on a real object that can be observed in a real space, or on the real object and an image, is referred to as an augmented reality (AR) image.

There are various types of virtual objects used in a content and a game using an AR image, and for example, a virtual object that behaves like a human, that is, a character is often used.

The AR image is displayed by using, for example, a head mounted display (HMD) worn on eyes of a user, a mobile terminal such as a smartphone, or the like.

By viewing the AR image, the user can enjoy a sense as if, for example, a displayed character in the AR image exists in the real world.

In a case where a character is displayed in the AR image, for example, display processing according to a content reproduction program such as a game program is performed.

Specifically, in a case where a character output condition recorded in the program is satisfied, the character is displayed in a procedure defined in the program.

However, when such character display defined in the program is performed, similar processing is always repeated, and fun is diminished.

Meanwhile, in recent years, researches and uses on semantic segmentation have been advanced as a technology for identifying an object in an image. The semantic segmentation is a technology for identifying types of various objects included in a camera-captured image, for example, a person, a car, a building, a road, a tree, and the like.

Note that, for example, Patent Document 1 (Japanese Patent Application Laid-Open No. 2015-207291) discloses the semantic segmentation.

CITATION LIST

Patent Document

Patent Document 1: Japanese Patent Application Laid-Open No. 2015-207291

SUMMARY OF THE INVENTION

Problems to be Solved by the Invention

The present disclosure provides an image processing apparatus, an image processing method, and a program that control a character to be displayed depending on a type of a real object.

An embodiment of the present disclosure provides an image processing apparatus, an image processing method, and a program that identify a background object of an image by object identification processing such as the semantic segmentation described above and control a character to be displayed depending on an identification result.

Solutions to Problems

A first aspect of the present disclosure is in
an image processing apparatus including:
an object identification unit that executes identification processing of a real object in a real world; and
a content display control unit that generates an augmented reality (AR) image in which a real object and a virtual object are superimposed and displayed, in which
the object identification unit
executes object identification processing of identifying a real object in a display area for the virtual object, and
the content display control unit
selects a virtual object to be displayed depending on an object identification result identified in the object identification unit.

Moreover, a second aspect of the present disclosure is in
an image processing method executed in an image processing apparatus, the method including:
executing, by an object identification unit, an object identification processing step of executing identification processing of a real object in a real world;
executing, by a content display control unit, a content display control step of generating an augmented reality (AR) image in which a real object and a virtual object are superimposed and displayed, in which
the object identification processing step
is a step of executing object identification processing of identifying a real object in a display area for the virtual object, and
the content display control step
executes a step of selecting a virtual object to be displayed depending on an object identification result identified in the object identification processing step.

Moreover, a third aspect of the present disclosure is in
a program for causing image processing to be executed in an image processing apparatus, the program:
causing an object identification unit to execute an object identification processing step of executing identification processing of a real object in a real world;
causing a content display control unit to execute a content display control step of generating an augmented reality (AR) image in which a real object and a virtual object are superimposed and displayed;
in the object identification processing step,
causing object identification processing to be executed, the object identification processing identifying a real object in a display area for the virtual object; and
in the content display control step, causing a step to be executed, the step selecting a virtual object to be displayed depending on an object identification result identified in the object identification processing step.

Note that, the program of the present disclosure is, for example, a program that can be provided by a communication medium or a storage medium provided in a computer readable form to a computer system or an information processing apparatus that can execute various program codes. By providing such a program in a computer readable form, processing is implemented according to the program on the information processing apparatus or the computer system.

Still other objects, features and advantages of the present disclosure will become apparent from the detailed description based on embodiments of the present disclosure and attached drawings to be described later. Note that, in this specification, the term "system" refers to a logical group configuration of a plurality of apparatuses, and is not limited to a system in which the apparatuses of respective configurations are in the same housing.

According to a configuration of an embodiment of the present disclosure, an apparatus and a method are implemented that performs selection or display mode change of a virtual object to be displayed depending on a real object type in a target area to be a display area for the virtual object.

Specifically, for example, included are the object identification unit that executes identification processing of the real object in the real world, and the content display control unit that generates the AR image in which the real object and the virtual object are superimposed and displayed. The object identification unit identifies a real object in the target area to be the display area for the virtual object, and the content display control unit performs processing of selecting the virtual object to be displayed or processing of changing the display mode depending on the object identification result.

With this configuration, an apparatus and a method are implemented that performs selection or display mode change of a virtual object to be displayed depending on a real object type in a target area to be a display area for the virtual object.

Note that, the advantageous effects described in this specification are merely exemplifications, and the advantageous effects of the present technology are not limited to them and may include additional effects.

BRIEF DESCRIPTION OF DRAWINGS

FIG. 4 is a diagram explaining processing executed by the image processing apparatus of the present disclosure.

FIG. 8 is a diagram explaining processing executed by the image processing apparatus of the present disclosure.

FIG. 10 is a diagram explaining a data configuration example of spatial map data.

FIG. 11 is a diagram explaining a data configuration example of class-associated update time data.

FIG. 12 is a diagram explaining a data configuration example of class-associated virtual object data.

FIG. 17 is a diagram illustrating a flowchart explaining a sequence of processing executed by the image processing apparatus of the present disclosure.

FIG. 18 is a diagram explaining a hardware configuration example of the image processing apparatus of the present disclosure.

MODE FOR CARRYING OUT THE INVENTION

Hereinafter, with reference to the drawings, details will be described of an image processing apparatus, an image processing method, and a program of the present disclosure. Note that, the description will be given in accordance with the following items.

1. Outline of processing executed by image processing apparatus of present disclosure
2. Configuration example of image processing apparatus of present disclosure
3. Sequence of processing executed by image processing apparatus of present disclosure
3-(1) Basic processing sequence executed by image processing apparatus
3-(2) Sequence of processing of setting set area of target area in substantially horizontal surface
3-(3) Update sequence for real object identification processing
4. Hardware configuration example of image processing apparatus
5. Summary of configuration of present disclosure

[1. Outline of Processing Executed by Image Processing Apparatus of Present Disclosure]

First, with reference to FIG. 1 and subsequent figures, an outline will be described of processing executed by the image processing apparatus of the present disclosure.

Figure 1:
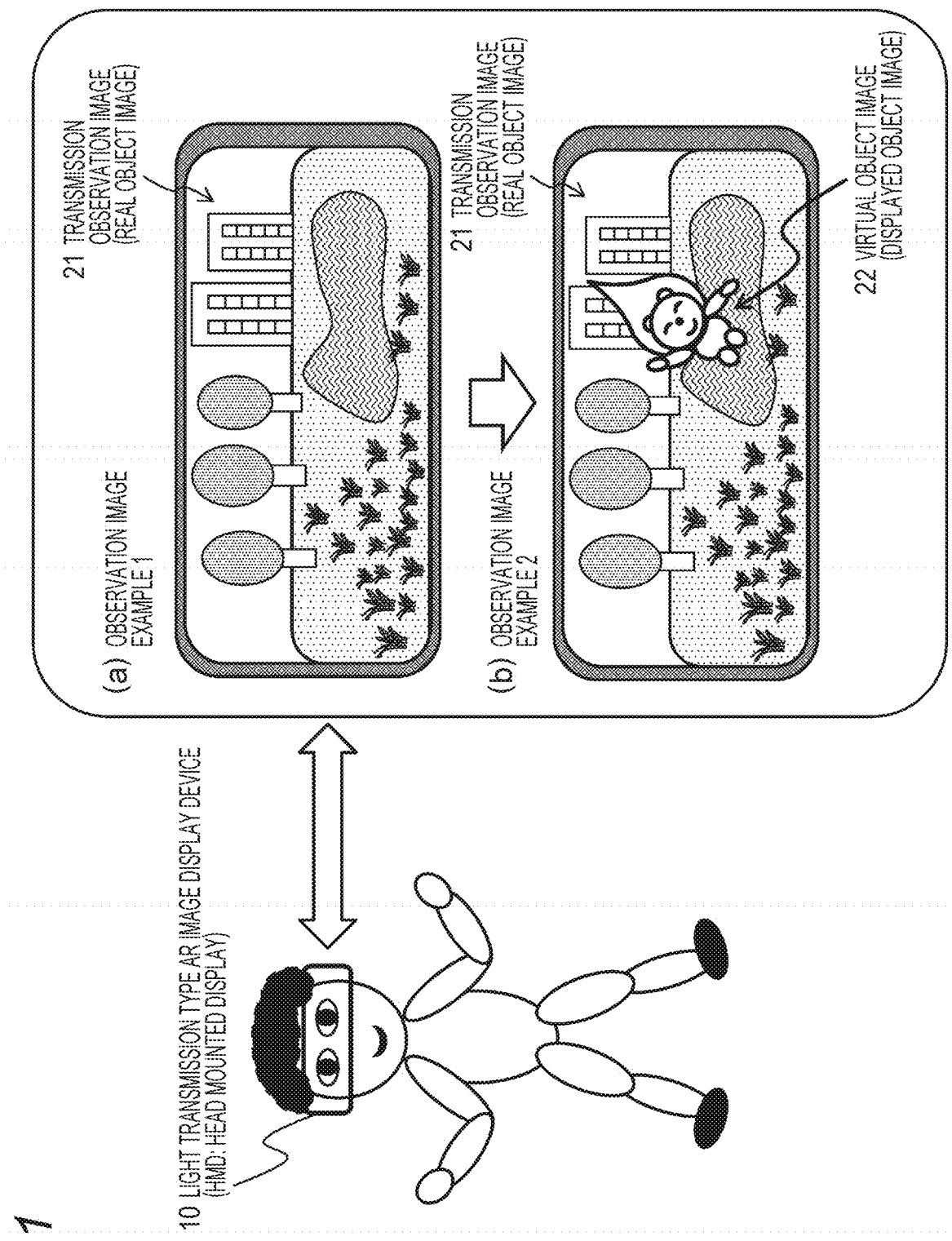
FIG. 1 is a diagram explaining a configuration example of an image processing apparatus of the present disclosure, and processing to be executed.

FIG. 1 illustrates a head mounted display (HMD) type light transmission type AR image display device 10 as an example of the image processing apparatus of the present disclosure.

A user wears the head mounted display (HMD) type light transmission type AR image display device 10 to cover eyes of the user.

The light transmission type AR image display device 10 includes a light transmission type display unit (display). The light transmission type display unit (display) is worn by the user to be set at a position in front of the eyes of the user.

The user can observe an external real object as it is via the light transmission type display unit (display) of the light transmission type AR image display device 10.

Moreover, a virtual object image of a virtual object, for example, a character image or the like is displayed on the light transmission type display unit (display).

The user can observe the external real object and a virtual object image of a character or the like together via the light transmission type AR image display device 10, and can feel a sense as if the virtual object such as the character exists like the real world.

The right side of FIG. 1 illustrates an example of an image that can be observed by the user via the light transmission type AR image display device 10.

In (a) Observation Image Example 1, included is a transmission observation image 21 including an external real object observed via the light transmission type AR image display device 10. In the image example 1, no virtual object is displayed.

On the other hand, (b) Observation Image Example 2 is an image example in which a virtual object image 22 such as a character image is displayed together with the transmission observation image 21 including the external real object observed via the light transmission type AR image display device 10. The image example 2 is an image in which the user can observe the real object and the virtual object together.

As described above, an image in which a virtual object is superimposed and displayed on a real object that can be observed in a real space, or on the real object and an image, is referred to as an augmented reality (AR) image.

The image processing apparatus of the present disclosure is an apparatus that performs display processing of the AR image.

The image processing apparatus of the present disclosure, for example, the light transmission type AR image display device 10 illustrated in FIG. 1 executes display control of a virtual object in AR image display.

Specific processing executed by the image processing apparatus of the present disclosure, for example, the light transmission type AR image display device 10 illustrated in FIG. 1 is, for example, the following processing.

(a) Processing of generating a three-dimensional map of the real world observed by the user via the light transmission type AR image display device 10 by applying simultaneous localization and mapping (SLAM) processing or the like that performs self-position estimation and environment three-dimensional map generation.

(b) Processing of identifying an object included in the real world by object identification processing such as semantic segmentation.

(c) Processing of selecting a virtual object (such as a character) to be displayed and controlling a display mode of the virtual object depending on an object identification result in the real world.

The image processing apparatus of the present disclosure executes these types of processing, for example.

Figure 2:
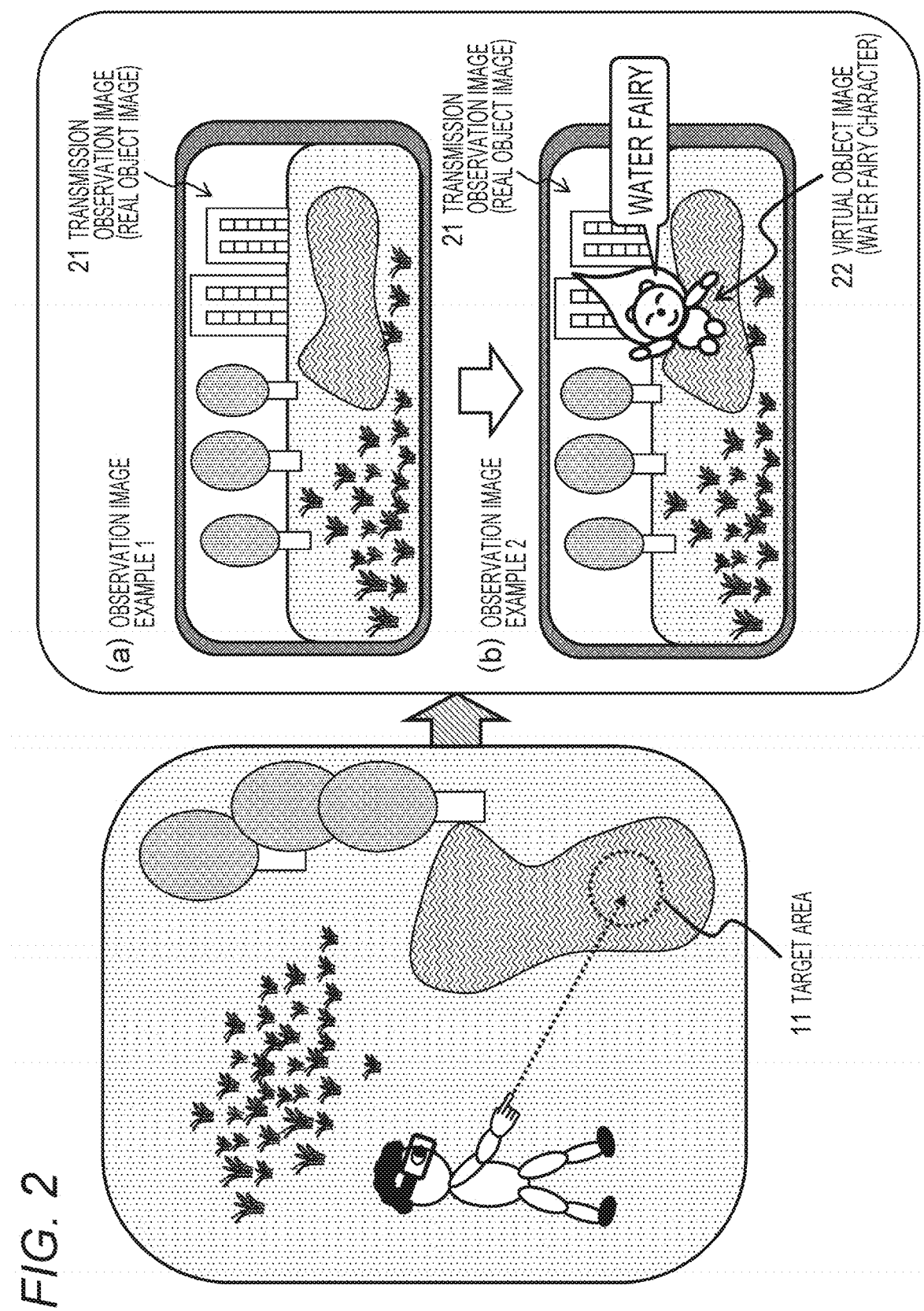
FIG. 2 is a diagram explaining processing executed by the image processing apparatus of the present disclosure.

With reference to FIG. 2 and subsequent figures, an example will be described of the display control of the virtual object executed by the image processing apparatus of the present disclosure.

A diagram illustrated on the left of FIG. 2 illustrates a state in which the user wearing the light transmission type AR image display device 10 walks around a park, and, near the pond, performs "pointing" toward a water surface of a pond while looking at the water surface of the pond.

The light transmission type AR image display device 10 includes a camera, captures an image in which the user has performed pointing, and the captured image is input to a three-dimensional map generation unit via an image analysis unit inside the device.

The image analysis unit extracts a feature point from the captured image, and the three-dimensional map generation unit generates a three-dimensional map of the real world by using the feature point extracted from the image.

Processing of generating the three-dimensional map is executed in real time by simultaneous localization and mapping (SLAM) processing, for example.

The simultaneous localization and mapping (SLAM) processing is processing that enables simultaneous execution of self-position estimation and environment three-dimensional map generation in parallel.

Moreover, the three-dimensional map generated by the three-dimensional map generation unit is input to an object identification unit of the image processing apparatus.

The object identification unit uses the three-dimensional map generated by the three-dimensional map generation unit to determine a real object area being in a pointing direction of the user, as a target area 11. Moreover, an object in the target area 11 is identified.

The object identification unit performs identification processing of an object in the real world by applying semantic segmentation processing, for example.

Semantic segmentation is a type of image recognition processing, and is a method of performing a task of recognizing what an object in an image is at a pixel level by using deep learning. It is a technology of identifying which object category each of constituent pixels (pixels) of an image belongs to, on the basis of a matching degree between, for example, dictionary data (learned data) for object identification in which shape information and other feature information of various actual objects are registered and, for example, an object in a camera-captured image.

With the semantic segmentation, it is possible to identify types of various objects included in the camera-captured image, for example, a person, a car, a building, a road, a tree, a pond, a lawn, and the like.

In the example illustrated in FIG. 2, the image analysis unit of the light transmission type AR image display device 10 determines that an object in the target area 11 in the pointing direction of the user is a "pond" on the basis of the camera-captured image.

Moreover, a content display control unit that executes virtual object display control in the light transmission type AR image display device 10 inputs an object identification result for the target area 11, and determines and displays selection processing and a display mode of a virtual object (character or the like) to be displayed in accordance with the object identification result.

In the example illustrated in FIG. 2, as illustrated in (b) Observation Image Example 2 on the right side of FIG. 2, control is performed to display an image of a "water fairy character" as the virtual object image 22.

This is display control based on an analysis result that the real object in the pointing direction of the user is the "pond".

That is, the content display control unit performs processing of selecting and displaying the "water fairy character" as an optimal virtual object according to the object identification result="pond" for the target area 11.

Note that, the virtual object image 22 is displayed as, for example, a 3D content image.

Figure 3:
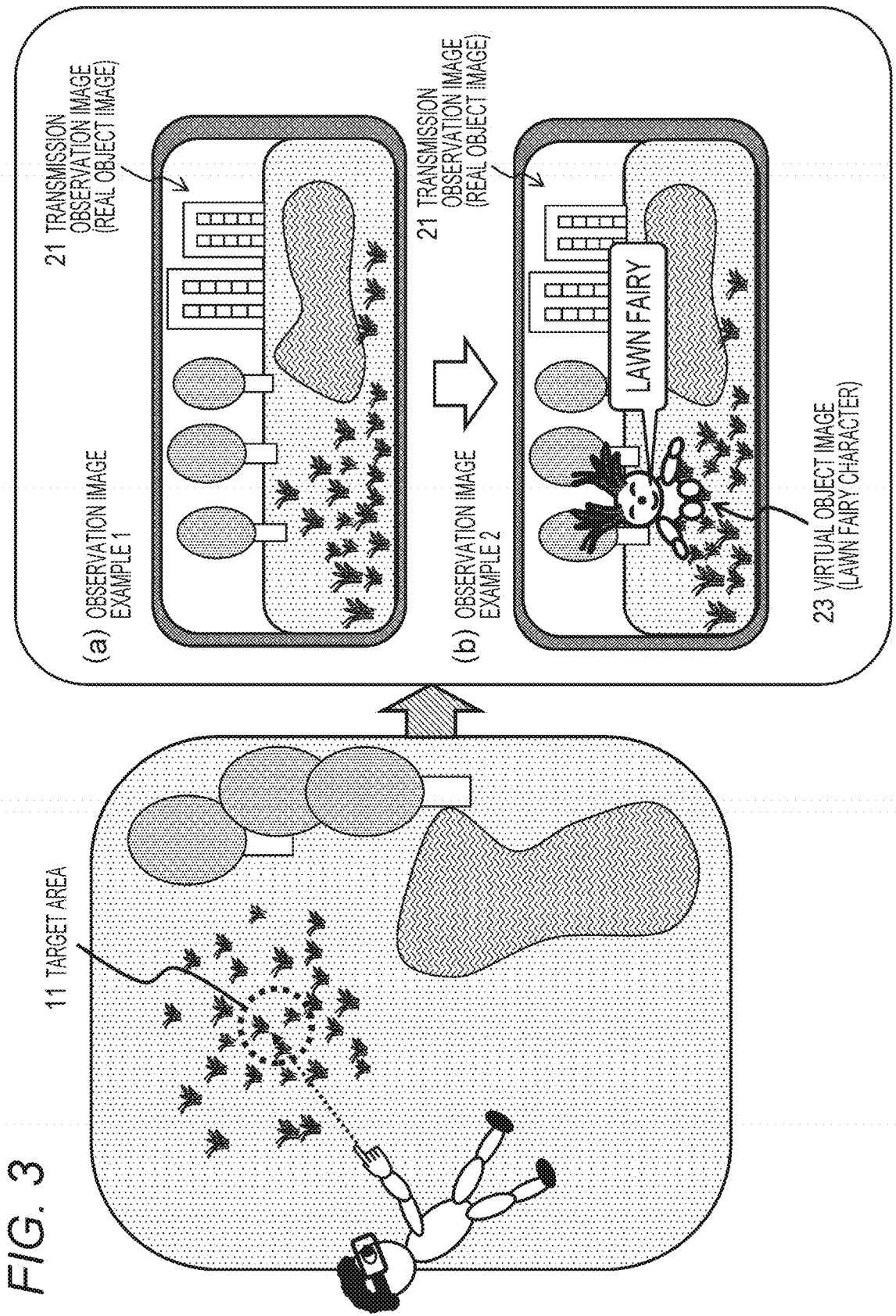
FIG. 3 is a diagram explaining processing executed by the image processing apparatus of the present disclosure.

FIG. 3 is a diagram explaining a display control example of a different virtual object executed by the image processing apparatus of the present disclosure.

Similarly to FIG. 2, a diagram illustrated on the left of FIG. 3 is a diagram in which the user wearing the light transmission type AR image display device 10 walks around the park. The user points in a direction of a lawn while looking at the lawn in the park.

In this case, the object identification unit of the light transmission type AR image display device 10 outputs an analysis result that an object in the target area 11 that is the pointing direction of the user is a "lawn" by an analysis of the camera-captured image.

Moreover, the content display control unit of the light transmission type AR image display device 10 inputs an object identification result for the target area 11, and determines and displays selection processing and a display mode of a virtual object (character or the like) to be displayed in accordance with the object identification result.

In the example illustrated in FIG. 3, as illustrated in (b) Observation Image Example 2 on the right side of FIG. 3, control is performed to display an image of a "grassland fairy character" as a virtual object image 23.

This is display control based on an analysis result that the real object in the pointing direction of the user is the "lawn".

That is, the content display control unit performs processing of selecting and displaying the "lawn fairy character" as an optimal virtual object according to the object identification result="lawn" for the target area 11.

FIG. 4 is a diagram explaining a display control example of a different virtual object executed by the image processing apparatus of the present disclosure.

Similarly to FIGS. 2 and 3, a diagram illustrated on the left of FIG. 4 is a diagram in which the user wearing the light transmission type AR image display device 10 walks around the park. The user points in a direction of a tree while looking at the tree in the park.

In this case, the object identification unit of the light transmission type AR image display device 10 outputs an analysis result that an object in the target area 11 that is the pointing direction of the user is a "tree" by an analysis of the camera-captured image.

Moreover, the content display control unit of the light transmission type AR image display device 10 inputs an object identification result for the target area 11, and determines and displays selection processing and a display mode of a virtual object (character or the like) to be displayed in accordance with the object identification result.

In the example illustrated in FIG. 4, as illustrated in (b) Observation Image Example 2 on the right side of FIG. 4, control is performed to display an image of a "tree fairy character" as the virtual object image 23.

This is display control based on an analysis result that the real object in the pointing direction of the user is the "tree".

That is, the content display control unit performs processing of selecting and displaying the "tree fairy character" as an optimal virtual object according to the object identification result="tree" for the target area 11.

As described above, the image processing apparatus of the present disclosure performs three-dimensional shape analysis in the real world by using SLAM processing or the like, generates a three-dimensional map in the real world, and moreover, identifies an object in a target area in the three-dimensional map in the real world by object identification processing such as the semantic segmentation, and executes display control of a virtual object such as a character to be displayed depending on an identification result.

Note that, a target of the real object to be analyzed by the object identification processing such as the semantic segmentation can be processed, for example, only in a limited area designated by the user's finger, that is, the target area. Thus, high-speed processing is implemented by limiting an analysis range.

Note that, the image processing apparatus of the present disclosure is not limited to the head mounted display (HMD) type light transmission type AR image display device 10 described with reference to FIG. 1, and can be configured by an apparatus including various display units.

Figure 5:
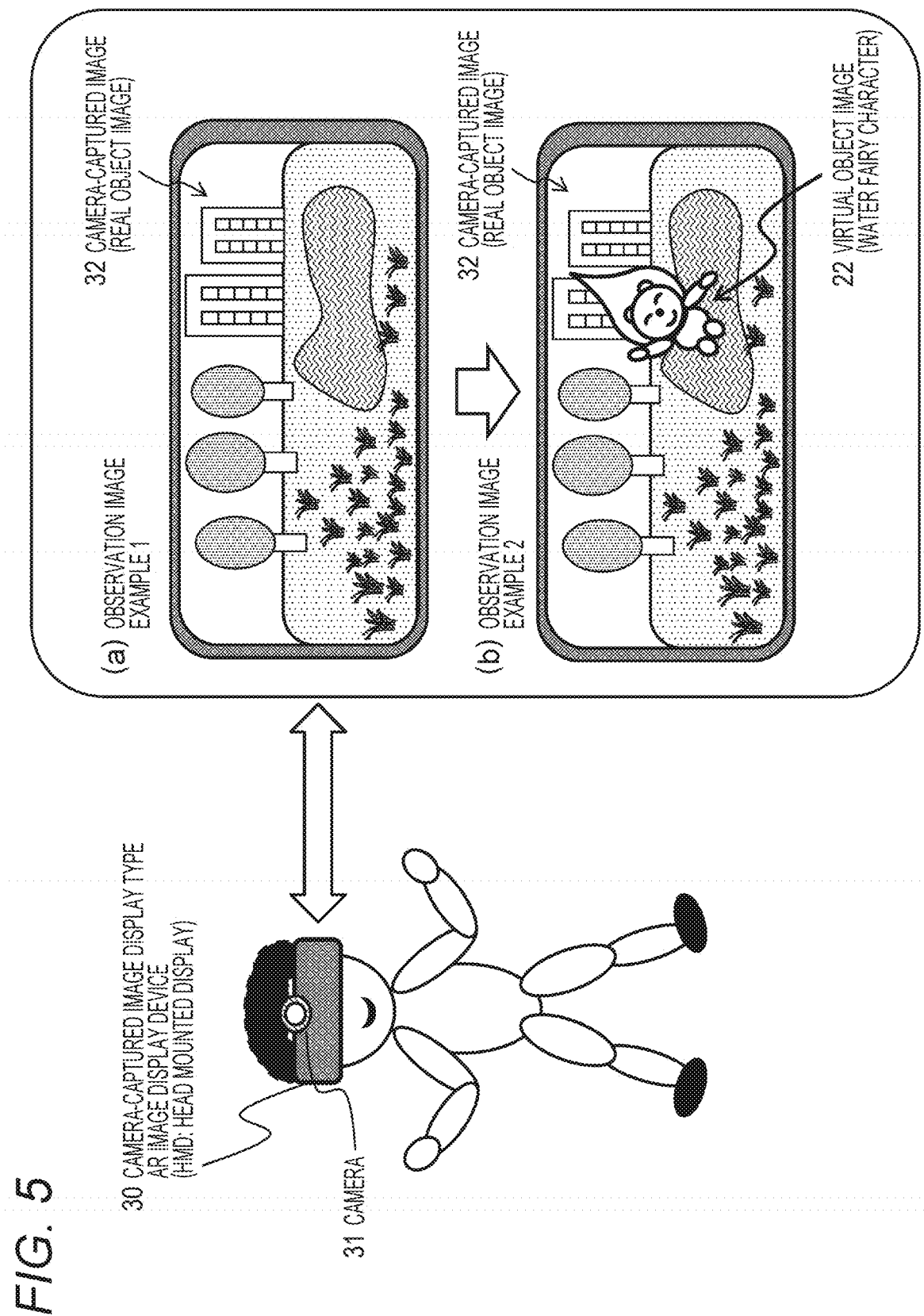
FIG. 5 is a diagram explaining a configuration example of the image processing apparatus of the present disclosure, and processing to be executed.

For example, a camera-captured image display type AR image display device 30 illustrated in FIG. 5 may be used. The camera-captured image display type AR image display device 30 illustrated in FIG. 5 includes a non-transmission type display unit (display). The light transmission type display unit (display) is worn by the user to be set at a position in front of the eyes of the user, which can be observed by the user.

A captured image by the camera 31 integrated with the camera-captured image display type AR image display device 30, that is, a camera-captured image 32 illustrated in FIG. 5 is displayed on the display unit in front of the eyes of the user. That is, an image of a real object captured by the camera 31 is displayed on the display unit in front of the eyes of the user, and the user can confirm an external scene by viewing the camera-captured image 32.

Moreover, the virtual object image 22 of a virtual object, for example, a character image or the like is displayed on the display unit (display).

The user can observe the camera-captured image 32 displayed on the display unit (display) of the camera-captured image display type AR image display device 30, that is, a real object image, and the virtual object image 22 of the character or the like together, and can feel a sense as if the virtual object such as the character exists like the real world.

Figure 6:
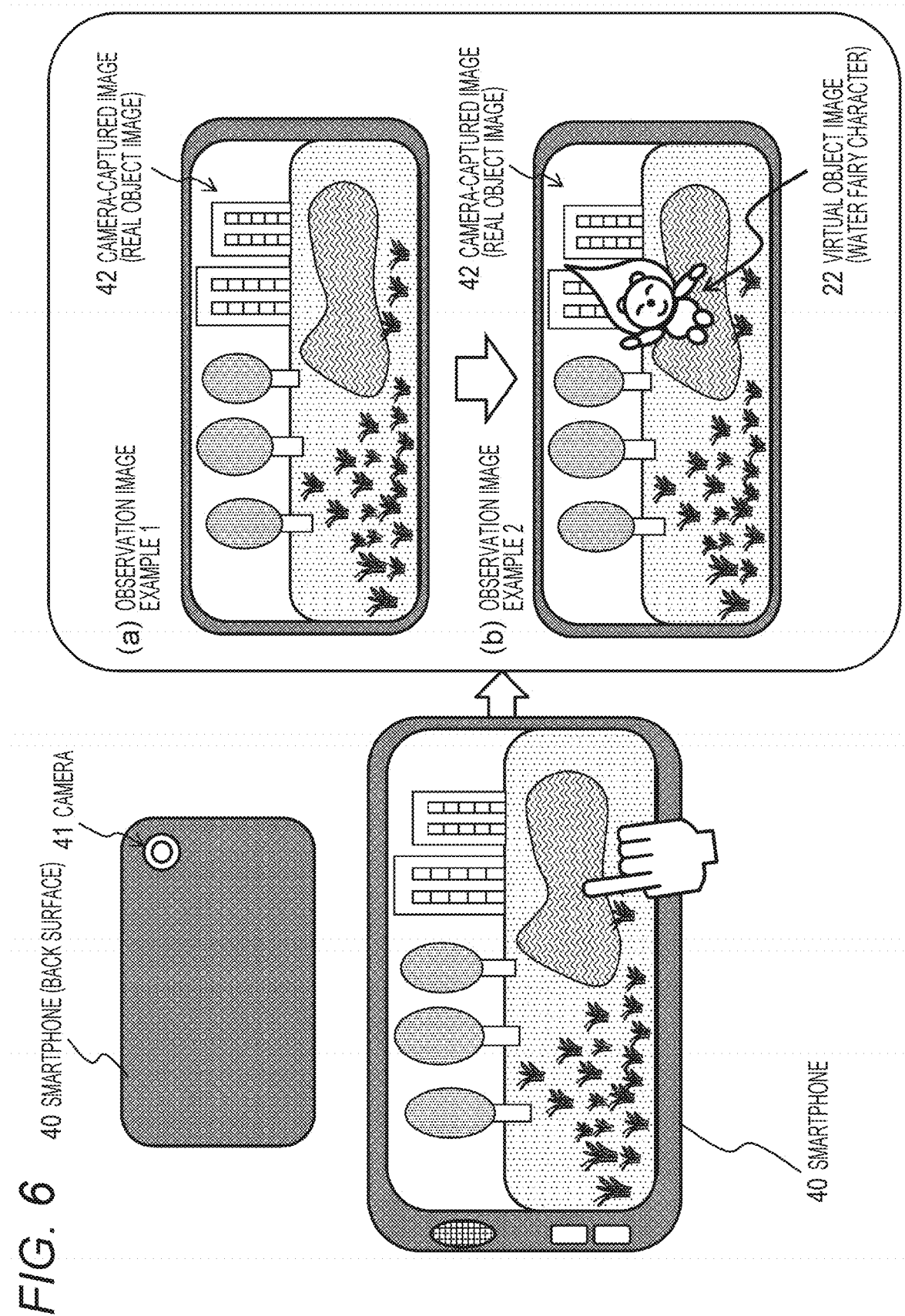
FIG. 6 is a diagram explaining a configuration example of the image processing apparatus of the present disclosure, and processing to be executed.

Moreover, the image processing apparatus of the present disclosure can be a portable display apparatus such as a smartphone 40 as illustrated in FIG. 6.

The smartphone 40 illustrated in FIG. 6 includes a display unit and a camera 41. A captured image by the camera 41, that is, a camera-captured image 42 illustrated in the figure is displayed on the display unit. That is, an image of a real object captured by the camera 41 is displayed on the display unit, and the user can confirm an external scene by viewing the camera-captured image.

Moreover, a virtual object image of a virtual object, for example, a character image or the like is displayed on the display unit (display).

The user can observe the camera-captured image displayed on the display unit (display) of the smartphone 40, that is, a real object image together with a virtual object image of a character or the like, and can feel a sense as if the virtual object such as the character exists like the real world.

Note that, in the example of the smartphone 40, in a case where the user touches a certain position of the display unit of the smartphone 40, the image analysis unit of the image processing apparatus (smartphone) analyzes the touched position and further determines the type of the real object at the touched position. Thereafter, the content display control unit of the image processing apparatus (smartphone) executes display control of the virtual object such as the character depending on a result of the determination.

As described above, the image processing apparatus of the present disclosure performs object identification such as whether a real object being in a target area to be a display position of a virtual object is water, grass, or a tree, and performs processing of selecting and displaying a virtual object such as a character to be displayed depending on an identification result.

Moreover, the image processing apparatus of the present disclosure executes not only the selection processing of a virtual object to be displayed according to a result of identification of the real object in the target area, but also processing of changing the display mode of the virtual object such as the character depending on the real object identification result.

Figure 7:
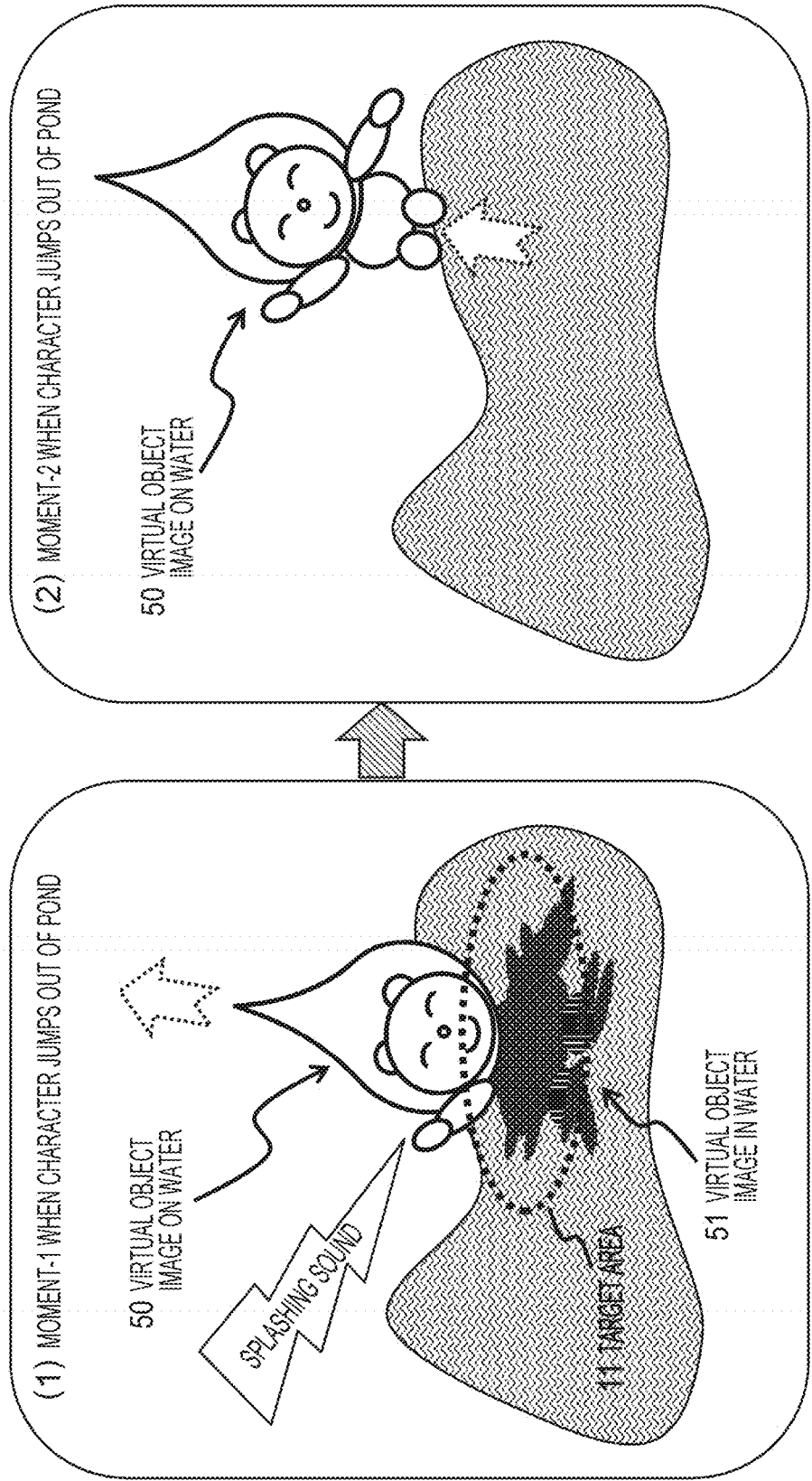
FIG. 7 is a diagram explaining processing executed by the image processing apparatus of the present disclosure.

With reference to FIG. 7 and subsequent figures, a specific example will be described of processing of changing the display mode of the virtual object according to the real object identification result.

FIG. 7 illustrates a display example of an AR image in which a virtual object (character) jumps out of a pond that is a real object, as an example of the AR image displayed on the display unit of the image processing apparatus of the present disclosure.

The content display control unit of the image processing apparatus of the present disclosure performs processing of causing a virtual object such as a character displayed in the target area to move or behave in accordance with a preset program.

The example illustrated in FIG. 7 illustrates an example of performing a display in which the character displayed in the target area 11 is moved in the upward direction.

FIG. 7(1), Moment-1 when the virtual object (character) jumps out of the pond, is a state in which only an upper half of the virtual object (character) is displayed on the water and a lower half is in the water.

In such a state, as illustrated in FIG. 7(1), the content display control unit of the image processing apparatus displays a virtual object image 50 on the water and a virtual object image 51 in the water in different display modes.

That is, the virtual object image 50 on the water is displayed as a normal image with a clear outline, while the virtual object image 51 in the water is displayed as an image with three-dimensional distortion as being present in the water.

Moreover, a content sound control unit of the image processing apparatus outputs a sound of water (splashing sound or the like) via a speaker as a sound effect when the character moves onto the water.

FIG. 7(2), Moment-2 when the virtual object (character) jumps out of the pond, is an AR image display example after FIG. 7(1). At this point, the whole body of the virtual object (character) is displayed above the water. In this state, the virtual object image 50 above the water is an image of the entire character, and the content display control unit of the image processing apparatus displays an entire character image as an image with a clear outline.

FIG. 8 is a diagram explaining another specific example of the processing of changing the display mode of the virtual object such as the character depending on the real object identification result.

FIG. 8 illustrates a display example of an AR image in which a shadow of a virtual object (character) is displayed, as an example of the AR image displayed on the display unit of the image processing apparatus of the present disclosure.

That is, when the content display control unit displays the character in the target area 11, the shadow of the character is also displayed.

"(1) Display example of shadow of character in case where surface on which shadow appears is flat surface" illustrated in FIG. 8 is a display example of a shadow in a case where a surface on which the shadow of the virtual object (character) image 50 appears is a flat surface such as a floor in a room or a sidewalk outside.

As described above, in the case where the surface on which the shadow of the virtual object (character) image 50 appears is the flat surface, when displaying the virtual object image 50 that is a three-dimensional character in the target area 11, the content display control unit of the image processing apparatus displays a virtual object shadow image 52 indicating the shadow of the virtual object image 50 as an image with a clear outline.

On the other hand, FIG. 8 "(2) Display example of shadow of character in case where surface on which shadow appears is non-flat surface (sand pit or the like)"

is a display example of a shadow in a case where the surface on which the shadow of the virtual object (character) image 50 appears is not a flat surface, for example, a sand pit.

As described above, in a case where the surface on which the shadow of the virtual object (character) image 50 appears is a bumpy surface such as a sand pit, when displaying the virtual object image 50 that is a three-dimensional character in the target area 11, the content display control unit of the image processing apparatus displays the virtual object shadow image 52 indicating the shadow of the virtual object image 50 as a bumpy image with an unclear outline.

As described above, the content display control unit of the image processing apparatus of the present disclosure performs control to change the display mode of the virtual object and perform display depending on the result of identification of the real object in the target area in which the virtual object is displayed, and furthermore, the content sound control unit performs output control of the sound effect depending on the result of identification of the real object in the target area.

[2. Configuration Example of Image Processing Apparatus of Present Disclosure]

Next, a configuration example will be described of the image processing apparatus of the present disclosure.

As described above, the image processing apparatus of the present disclosure can be implemented as an apparatus having various forms, such as the light transmission type AR image display device 10 described with reference to FIG. 1, the camera-captured image display type AR image display device 30 described with reference to FIG. 5, or a portable display apparatus such as the smartphone 40 described with reference to FIG. 6.

Figure 9:
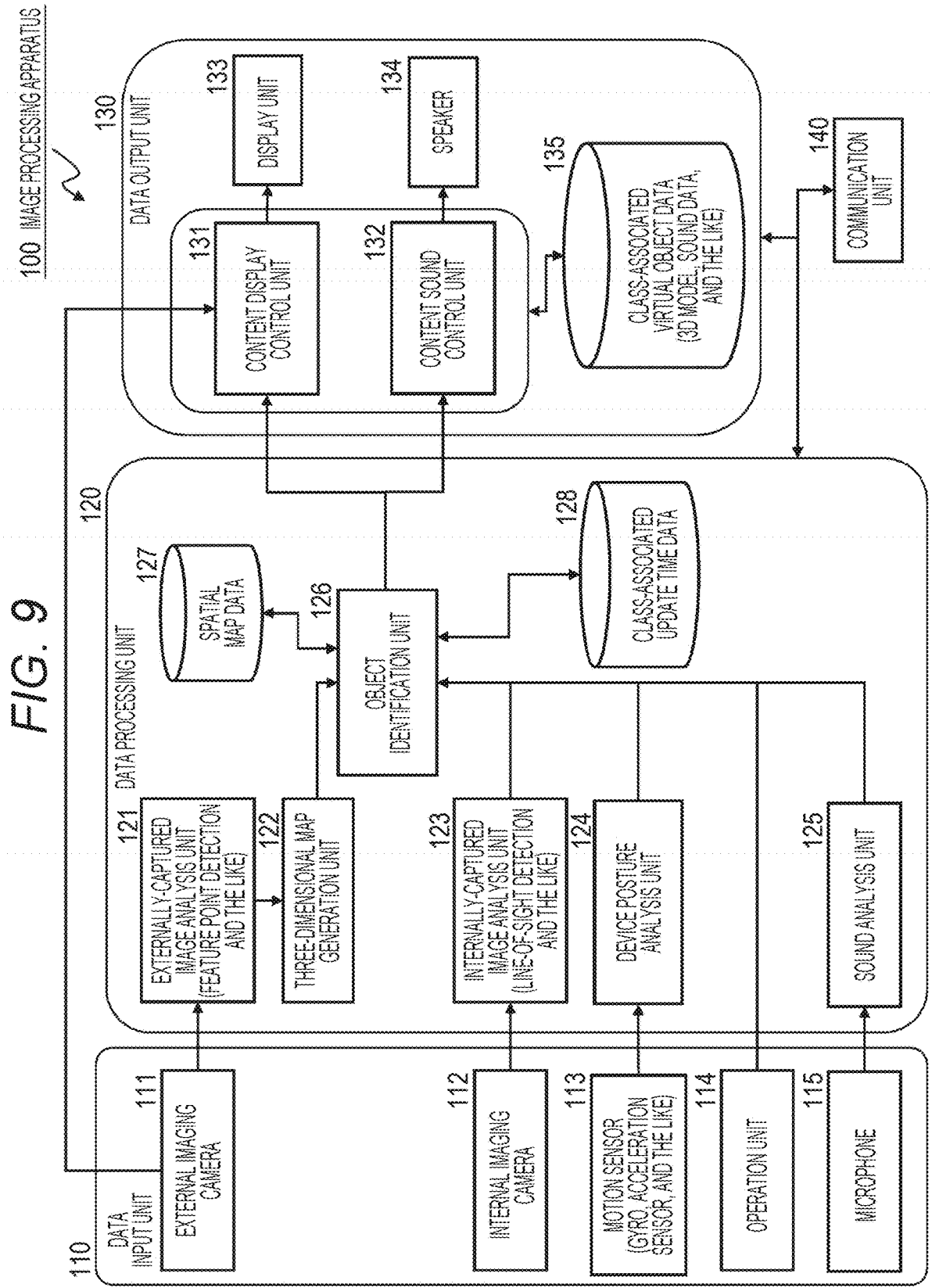
FIG. 9 is a diagram explaining a configuration example of the image processing apparatus of the present disclosure.

FIG. 9 is a block diagram illustrating a configuration example of the image processing apparatus of the present disclosure that can take these various forms.

A configuration will be described of an image processing apparatus 100 illustrated in FIG. 9.

As illustrated in FIG. 9, the image processing apparatus 100 includes a data input unit 110, a data processing unit 120, a data output unit 130, and a communication unit 140.

The data input unit 110 includes an external imaging camera 111, an internal imaging camera 112, a motion sensor (gyro, acceleration sensor, or the like) 113, an operation unit 114, and a microphone 115.

The data processing unit 120 includes an externally-captured image analysis unit 121, a three-dimensional map generation unit 122, an internally-captured image analysis unit 123, a device posture analysis unit 124, a sound analysis unit 125, an object identification unit 126, spatial map data 127, and class-associated update time data 128.

The data output unit 130 includes a content display control unit 131, a content sound control unit 132, a display unit 133, a speaker 134, and class-associated virtual object data (3D model, sound data, and the like) 135.

The external imaging camera 111 of the data input unit 110 captures an external image. For example, an image is captured of an outside scene or the like in an environment where the user wearing the HMD is present. In the case of a mobile terminal such as a smartphone, a camera included in the smartphone or the like is used.

The internal imaging camera 112 basically is a component unique to the HMD, and captures an image of an area of the eyes of the user for analyzing a line-of-sight direction of the user.

The motion sensor (gyro, acceleration sensor, or the like) 113 detects posture and movement of the image processing apparatus 100 main body, for example, an HMD, a smartphone, or the like.

The motion sensor di 113 includes, for example, a gyro, an acceleration sensor, an orientation sensor, a single positioning sensor, an inertial measurement unit (IMU), and the like.

The operation unit 114 is an operation unit that can be operated by the user, and is used for input of a target area, input of other processing instructions, and the like, for example.

The microphone 115 is used for input of an instruction by voice input by the user, and the like. Furthermore, the microphone can also be used to input external environmental sound.

Next, components of the data processing unit 120 will be described.

The externally-captured image analysis unit 121 inputs a captured image of the outside captured by the external imaging camera 111, and extracts a feature point from the externally-captured image.

Processing of extracting the feature point is a feature point used for generating a three-dimensional map, and extracted feature point information is input to the three-dimensional map generation unit 122 together with the captured image of the outside captured by the external imaging camera 111.

The three-dimensional map generation unit 122 generates a three-dimensional map including an external real object on the basis of the captured image of the outside captured by the external imaging camera 111 and the feature point extracted by the externally-captured image analysis unit 121.

Processing of generating the three-dimensional map is executed as real-time processing by simultaneous localization and mapping (SLAM) processing, for example.

As described above, the simultaneous localization and mapping (SLAM) processing is processing that enables simultaneous execution of self-position estimation and environment three-dimensional map generation in parallel.

Three-dimensional map data of an external environment generated by the three-dimensional map generation unit 122 is input to the object identification unit 126.

The internally-captured image analysis unit 123 analyzes the line-of-sight direction of the user on the basis of the image of the area of the eyes of the user captured by the internal imaging camera 112. Similarly to the internal imaging camera 112 described above, the internally-captured image analysis unit 123 basically is a component unique to the HMD.

User line-of-sight information analyzed by the internally-captured image analysis unit 123 is input to the object identification unit 126.

The device posture analysis unit 124 analyzes the posture and movement of the image processing apparatus 100 main body such as an HMD or a smartphone on the basis of sensor detection information measured by the motion sensor (gyro, acceleration sensor, or the like) 113.

Posture and movement information of the image processing apparatus 100 main body analyzed by the device posture analysis unit 124 are input to the object identification unit 126.

The sound analysis unit 125 analyzes a user voice and an environmental sound input from the microphone 115. An analysis result is input to the object identification unit 126.

The object identification unit 126 inputs the three-dimensional map generated by the three-dimensional map generation unit 122, determines a target area to be set as a display area for a virtual object, and further executes identification processing of a real object in the determined target area. Object identification processing is executed, for example, the target area is a pond, a tree, or the like.

Processing of identifying the target area can be executed by various methods.

For example, it can be performed by using an image of the user's finger included in the three-dimensional map.

An intersection is obtained between an extension line in a pointing direction of the user and the real object on the three-dimensional map, and for example, a circular area having a predefined radius centered on the intersection is determined as the target area.

Note that, designation of the target area can also be performed by a method other than pointing by the user. The object identification unit 126 can use any of the following information as information for use in determining the target area.

(a) User line-of-sight information analyzed by the internally-captured image analysis unit 123

(b) Posture and movement information of the image processing apparatus 100 main body analyzed by the device posture analysis unit 124

(c) User operation information input via the operation unit 114

(d) User voice information analyzed by the sound analysis unit 125

In a case where "(a) user line-of-sight information analyzed by the internally-captured image analysis unit 123" is used, the object identification unit 126 obtains an intersection between an extension line of the line-of-sight direction of the user and the real object on the three-dimensional map, and determines, as the target area, a circular area having a predetermined radius centered on the intersection, for example.

In a case where "(b) posture and movement information of the image processing apparatus 100 main body analyzed by the device posture analysis unit 124" is used, the object identification unit 126 obtains an intersection between an extension line in a frontward direction of the HMD worn by the user or the smartphone held by the user and the real object on the three-dimensional map, and determines, as the target area, a circular area having a predetermined radius centered on the intersection, for example.

In a case where "(c) user operation information input via the operation unit 114" is used, the object identification unit 126 determines the target area on the basis of, for example, user operation information input via the input unit of the image processing apparatus 100.

For example, in a configuration using the smartphone illustrated in FIG. 6 described earlier, it is possible to perform processing of inputting screen position designation information by the user's finger as the user operation information and setting a designated position of the screen position designation information as the center position of the target area.

Note that, in addition to this, a bar-shaped indication member separated from the image processing apparatus 100 may be used as the operation unit 114, indication direction information by the indication member may be input to the object identification unit 126, and the target area may be determined on the basis of the indication direction.

In a case where "(d) user voice information analyzed by the sound analysis unit 125" is used, the object identification unit 126 analyzes, for example, an utterance by the user to determine the target area.

For example, in a case where the user utterance is an utterance such as "pond in front", the color is determined as the target area.

Moreover, the object identification unit 126 may perform target area determination processing other than these. For example, detection processing of a horizontal surface such as a ground surface, a floor surface, or a water surface may be executed, on the basis of the three-dimensional map generated on the basis of an image captured by the external imaging camera 111 or detection information from the motion sensor 113, and processing may be executed of determining, as the target area, an area of a horizontal surface closest to the center area of the captured image.

Furthermore, processing may be performed in which, for example, the user performs an operation of throwing a virtual ball, an image of the virtual ball is captured by the external imaging camera 111, a landing point of the ball is analyzed by analyzing the captured image, and the landing point is set to the center position of the target area.

The object identification unit 126 determines a target area to be a virtual object display area by using any of the above-described methods. Moreover, identification processing is executed of a real object in the determined target area. Object identification processing is executed, for example, the target area is a pond, a tree, or the like.

As described above, the object identification processing of the real object is executed by applying the semantic segmentation processing, for example.

The semantic segmentation is a technology of identifying which object category each of constituent pixels (pixels) of an image belongs to, on the basis of a matching degree between, for example, dictionary data (learned data) for object identification in which shape information and other feature information of various actual objects are registered and, for example, an object in a camera-captured image.

With the semantic segmentation, it is possible to identify types of various objects included in the camera-captured image, for example, a person, a car, a building, a road, a tree, a pond, a lawn, and the like.

Note that, the identification processing of the real object executed by the object identification unit 126 is executed for only the target area or only a limited range of a surrounding area including the target area. By performing such processing in a limited range, high-speed processing, that is, real-time processing can be performed. Note that. The real-time processing means that the identification processing of the real object is immediately executed after the target area is designated by the user, for example. As a result, the object identification is completed without a time delay while the user observes the target area, for example.

The result of identification of the real object in the target area analyzed by the object identification unit 126 is input to the content display control unit 131 and the content sound control unit 132 of the data output unit 130.

The content display control unit 131 of the data output unit 130 inputs the object identification result for the target area from the object identification unit 126, determines selection processing and a display mode of a virtual object (character or the like) to be displayed in accordance with the object identification result, and displays the virtual object on the display unit 133.

Specifically, the display processing is executed of the virtual object (character or the like) as illustrated in FIGS. 2 to 4, 7, and 8 described earlier, for example.

The content sound control unit 132 of the data output unit 130 inputs the object identification result for the target area from the object identification unit 126, determines a sound to be output in accordance with the object identification result, and outputs the sound via the speaker 134.

Specifically, for example, as illustrated in FIG. 7 described earlier, in a case where a virtual object appears from a pond that is a real object, processing of outputting a sound of water is executed.

Note that, the content display control unit 131 and the content sound control unit 132 of the data output unit 130 acquire a 3D content and various sound data of the fancy-dress object recorded in the class-associated virtual object data 135 and execute data output.

In the class-associated virtual object data 135, the 3D content and various sound data of the fancy-dress object for display associated with a real object type (class) corresponding to the result of identification of the real object in the target area are recorded.

A specific example of the class-associated virtual object data 135 will be described later.

Furthermore, in a case where the image processing apparatus 100 is configured to perform processing of displaying a camera-captured image, for example, as in the camera-captured image display type AR image display device 30 described with reference to FIG. 5 or the smartphone 40 described with reference to FIG. 6, the content display unit 131 inputs the captured image of the external imaging camera 11, generates a display image in which a virtual object is superimposed on the captured image, and displays the display image on the display unit 133.

The communication unit 140 communicates with, for example, an external server and acquires a 3D content of a character that is a virtual content. In addition, various data and parameters required for data processing may be acquired from the external server.

Note that, the object identification unit 126 stores the identification result in a storage unit as the spatial map data 127 when performing the identification processing of the real object in the target area.

FIG. 10 illustrates a data configuration example of the spatial map data 127.

As illustrated in FIG. 10, associated data of each piece of data below is stored in the spatial map data.

(a) Time stamp (sec)
(b) Position information
(c) Class
(d) Elapsed time after identification processing (sec)

The (a) time stamp (sec) is time information on execution of the object identification processing.

The (b) position information is position information of a real object that is an object identification target. As a method of recording the position information, various methods can be used. The example illustrated in the figure is an example described as a mesh by a list of three-dimensional coordinates (x, y, z). In addition, for example, position information of the center position of the target area may be recorded.

The (c) class is object type information as an object identification result.

The (d) elapsed time after identification processing (sec) is an elapsed time from completion of the object identification processing.

Note that, the object identification unit 126 executes the identification processing of the real object in the target area immediately after the target area is determined, and thereafter, repeatedly executes the object identification processing for the area and sequentially updates the spatial map data illustrated in FIG. 10.

However, an interval of the update processing varies depending on a type (class) of the identified real object.

Specified data of update times different depending on the type (class) of the real object is registered in advance as the class-associated update time data 128.

FIG. 11 illustrates a data example of the class-associated update time data 128.

As illustrated in FIG. 11, the class-associated update time data 128 is data in which pieces of data below are associated with each other.

(a) ID
(b) Category
(c) Class
(d) Update time (sec)

The (a) ID is an identifier of registered data.

The (b) category is a category of a type (class) of the real object.

The (c) class is type information of the real object.

The (d) update time (sec) is a time indicating an update interval of the real object identification processing.

For example, in a case of the class (object type) of ID001=lawn, the update time is 3600 sec (=1 hour). In an object such as the lawn, a change with a lapse of time is small, and the update time is set to be long.

On the other hand, for example, in a case of the class (object type) of ID=004=shadow, the update time is 2 sec. In an object such as the shadow, a change with a lapse of time is large, so that the update time is set to be short.

The object identification unit 126 refers to the data of the class-associated update time data 128, and repeatedly executes the object identification processing at a time interval defined for the identified object as needed. Real objects detected by new identification processing are sequentially registered as the spatial map data 127 described with reference to FIG. 10.

Furthermore, as described above, the content display control unit 131 and the content sound control unit 132 of the data output unit 130 acquire the 3D content and various sound data of the fancy-dress object recorded in the class-associated virtual object data 135 and execute data output.

In the class-associated virtual object data 135, the 3D content and various sound data of the fancy-dress object for display associated with a real object type (class) corresponding to the result of identification of the real object in the target area are recorded.

A specific example of the class-associated virtual object data 135 will be described with reference to FIG. 12.

As illustrated in FIG. 12, pieces of data below are recorded in association with each other in the class-associated virtual object data 135.

(a) Class
(b) Virtual object 3D model (character 3D model)
(c) Output sound

The (a) class is type information of the real object.

As the (b) virtual object 3D model (character 3D model), 3D models are registered of virtual objects (characters) to be output (displayed) depending on each class, that is, the type of the real object in the target area. Note that, in the example illustrated in the figure, the ID of the 3D model and the 3D model are recorded together, but for example, only the ID may be recorded, and the 3D model associated with the ID may be acquired from another database on the basis of the ID.

As the (c) output sound, sound data is registered to be output depending on each class, that is, the type of the real object in the target area.

As described above, in the class-associated virtual object data 135, the 3D content and various sound data of the fancy-dress object for display associated with the real object type (class) corresponding to the result of identification of the real object in the target area are recorded.

Note that, output mode information of each virtual object is also recorded in the class-associated virtual object data 135. For example, as described earlier with reference to FIGS. 7 and 8, information is also recorded, such as display mode information in a case where the real object in the target area is water, or display mode information in a case where the real object in the target area is a sand pit.

The content display control unit 131 and the content sound control unit 132 of the data output unit 130 acquire the 3D content and various sound data of the fancy-dress object recorded in the class-associated virtual object data 135 storing the data as illustrated in FIG. 12 and execute data output.

[3. Sequence of Processing Executed by Image Processing Apparatus of Present Disclosure]

Next, a sequence will be described of processing executed by the image processing apparatus 100 of the present disclosure.

Note that, a plurality of processing sequences described below will be sequentially described.

(1) Basic processing sequence executed by image processing apparatus
(2) Sequence of processing of setting set area of target area in substantially horizontal surface
(3) Update sequence for real object identification processing (3-1) Basic Processing Sequence Executed by Image Processing Apparatus)

First, with reference to a flowchart illustrated in FIG. 13, a sequence will be described of basic processing executed by the image processing apparatus 100 of the present disclosure.

Figure 13:
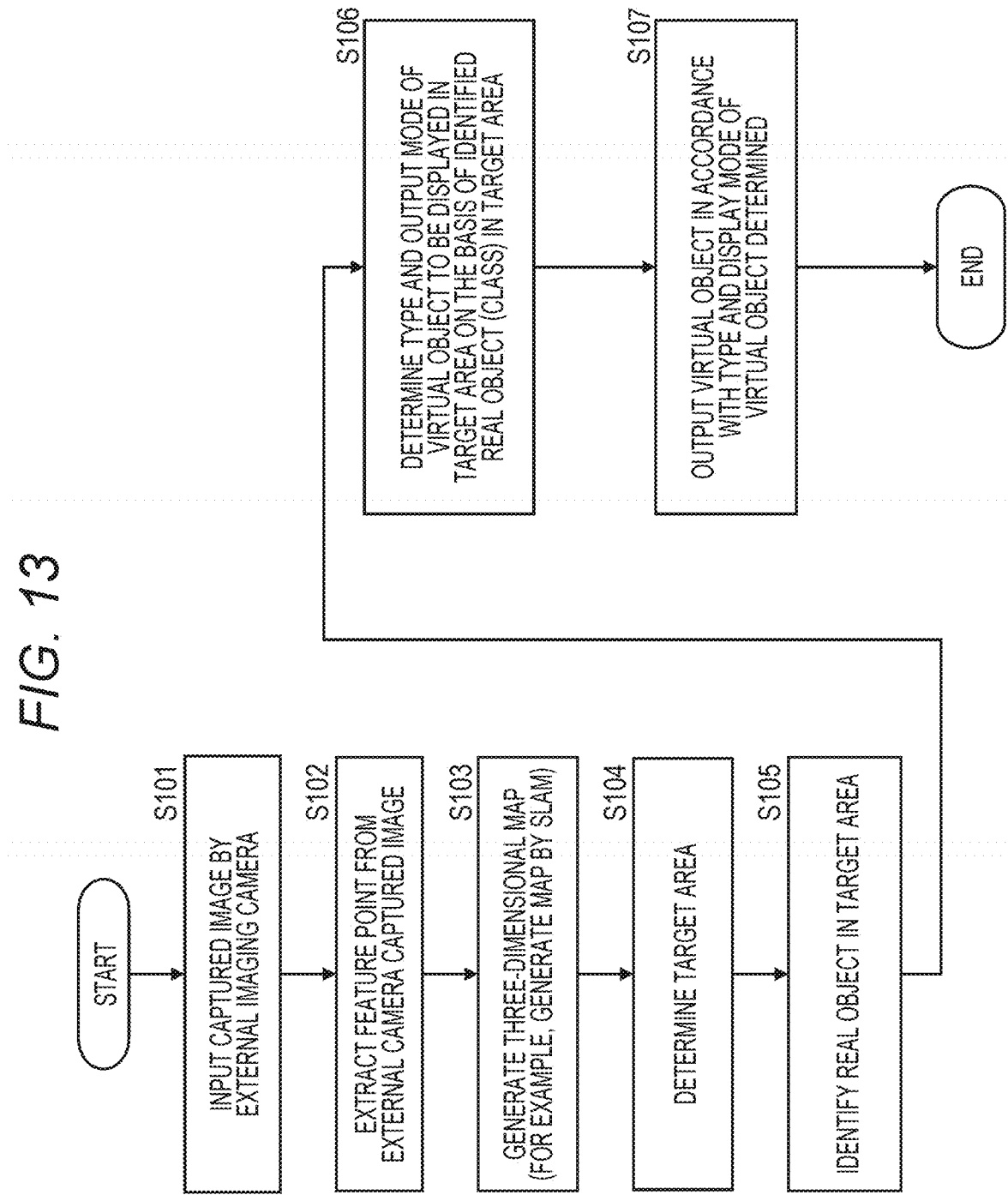
FIG. 13 is a diagram illustrating a flowchart explaining a sequence of processing executed by the image processing apparatus of the present disclosure.

Note that, processing according to flowcharts illustrated in FIG. 13 and subsequent figures is processing mainly executed in the data processing unit 120 of the image processing apparatus 100. The data processing unit 120 includes a CPU having a program execution function, and executes processing according to a flow in accordance with a program stored in the storage unit.

Hereinafter, processing will be described of each step of the flow illustrated in FIG. 13.

(Step S101)

First, in step S101, the data processing unit 120 of the image processing apparatus 100 inputs a captured image by the external imaging camera.

(Step S102)

Next, in step S102, the data processing unit 120 extracts a feature point from the captured image input by the external imaging camera.

This processing is processing executed by the externally-captured image analysis unit 121 of the data processing unit 120 illustrated in FIG. 9.

The externally-captured image analysis unit 121 extracts a feature point from the captured image input by the external imaging camera. Processing of extracting the feature point is a feature point used for generating a three-dimensional map, and extracted feature point information is input to the three-dimensional map generation unit 122 together with the captured image of the outside captured by the external imaging camera.

(Step S103)

Next, in step S103, the data processing unit generates a three-dimensional map by using a captured image of the outside captured by the external imaging camera and feature point information thereof.

This processing is processing executed by the three-dimensional map generation unit 122 of the data processing unit 120 illustrated in FIG. 9.

The three-dimensional map generation unit 122 generates a three-dimensional map including an external real object on the basis of the captured image of the outside captured by the external imaging camera 111 and the feature point extracted by the externally-captured image analysis unit 121.

Processing of generating the three-dimensional map is executed as real-time processing by simultaneous localization and mapping (SLAM) processing, for example.

(Step S104)

Next, in step S104, the data processing unit executes target area determination processing.

This processing is processing executed by the object identification unit 126 of the data processing unit 120 illustrated in FIG. 9.

The object identification unit 126 determines the target area to be the virtual object display area.

As described above, various methods can be applied to the target area determination processing.

For example, it can be performed by using an image of the user's finger included in the three-dimensional map.

That is, an intersection is obtained between an extension line in a pointing direction of the user and the real object on the three-dimensional map, and for example, a circular area having a predefined radius centered on the intersection is determined as the target area.

Moreover, it is also possible to determine the target area by using input information from each component of the data input unit 110 illustrated in FIG. 9. Specifically, the input information is the following input information.

(a) User line-of-sight information analyzed by the internally-captured image analysis unit 123
(b) Posture and movement information of the image processing apparatus 100 main body analyzed by the device posture analysis unit 124
(c) User operation information input via the operation unit 114
(d) User voice information analyzed by the sound analysis unit 125

For example, the target area may be determined by using any of these pieces of input information.

A representative target area determination sequence will be described with reference to FIGS. 14 and 15.

Figure 14:
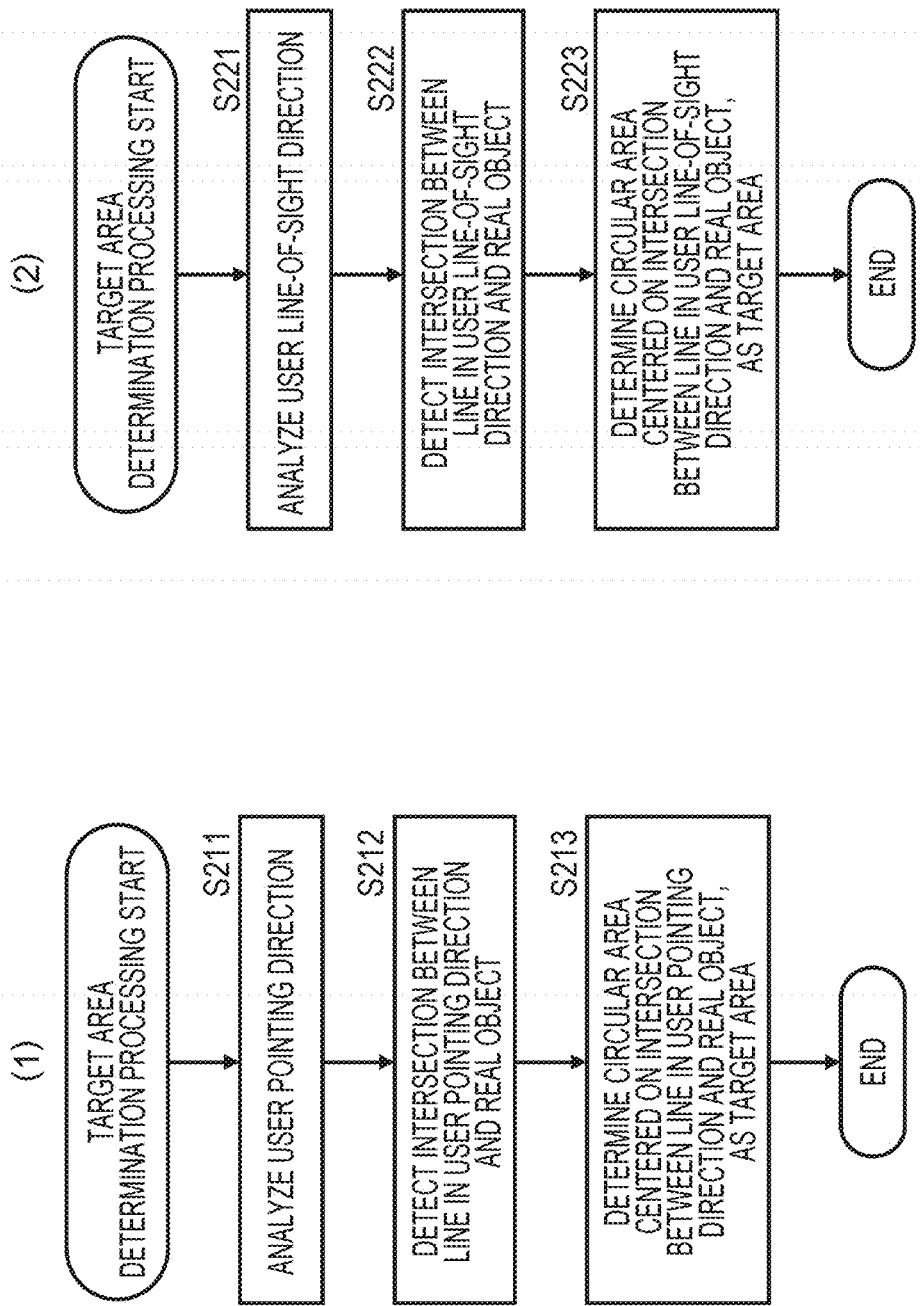
FIG. 14 is a diagram illustrating a flowchart explaining a sequence of target area determination processing executed by the image processing apparatus of the present disclosure.

FIG. 14(1) illustrates a target area determination sequence based on an analysis of the pointing direction of the user. The target area determination processing based on the analysis of the pointing direction of the user is executed in the following processing sequence.

First, in step S211, the pointing direction of the user is analyzed. This analysis processing is executed by using the three-dimensional map generated by the three-dimensional map generation unit 122.

Next, in step S212, an intersection between a straight line formed by the extension line in the pointing direction of the user and the real object is detected. This processing is also executed by using the three-dimensional map generated by the three-dimensional map generation unit 122.

Finally, in step S213, a circular area centered on the intersection between the straight line formed by the extension line in the pointing direction of the user and the real object is determined as the target area.

Note that, a shape of the target area is arbitrary, and may be a rectangular shape besides a circular shape. The size of the target area is also arbitrary, and can be set in various sizes.

However, it is preferable that the shape and size are defined in advance, and the target area is determined in accordance with the definition.

FIG. 14(2) illustrates a target area determination sequence based on an analysis of a user line-of-sight direction. The target area determination processing based on the analysis of the user line-of-sight direction is executed in the following processing sequence.

First, in step S221, the line-of-sight direction of the user is analyzed. This analysis processing is executed by the internally-captured image analysis unit 123 on the basis of the captured image by the internal imaging camera 112.

Next, in step S222, an intersection between a straight line formed by an extension line of the user line-of-sight direction and the real object is detected. This processing is executed by using the three-dimensional map generated by the three-dimensional map generation unit 122.

Finally, in step S223, a circular area centered on the intersection between the straight line formed by the extension line of the user line-of-sight direction and the real object is determined as the target area.

Note that, as described above, the shape and size of the target area can be variously set.

Figure 15:
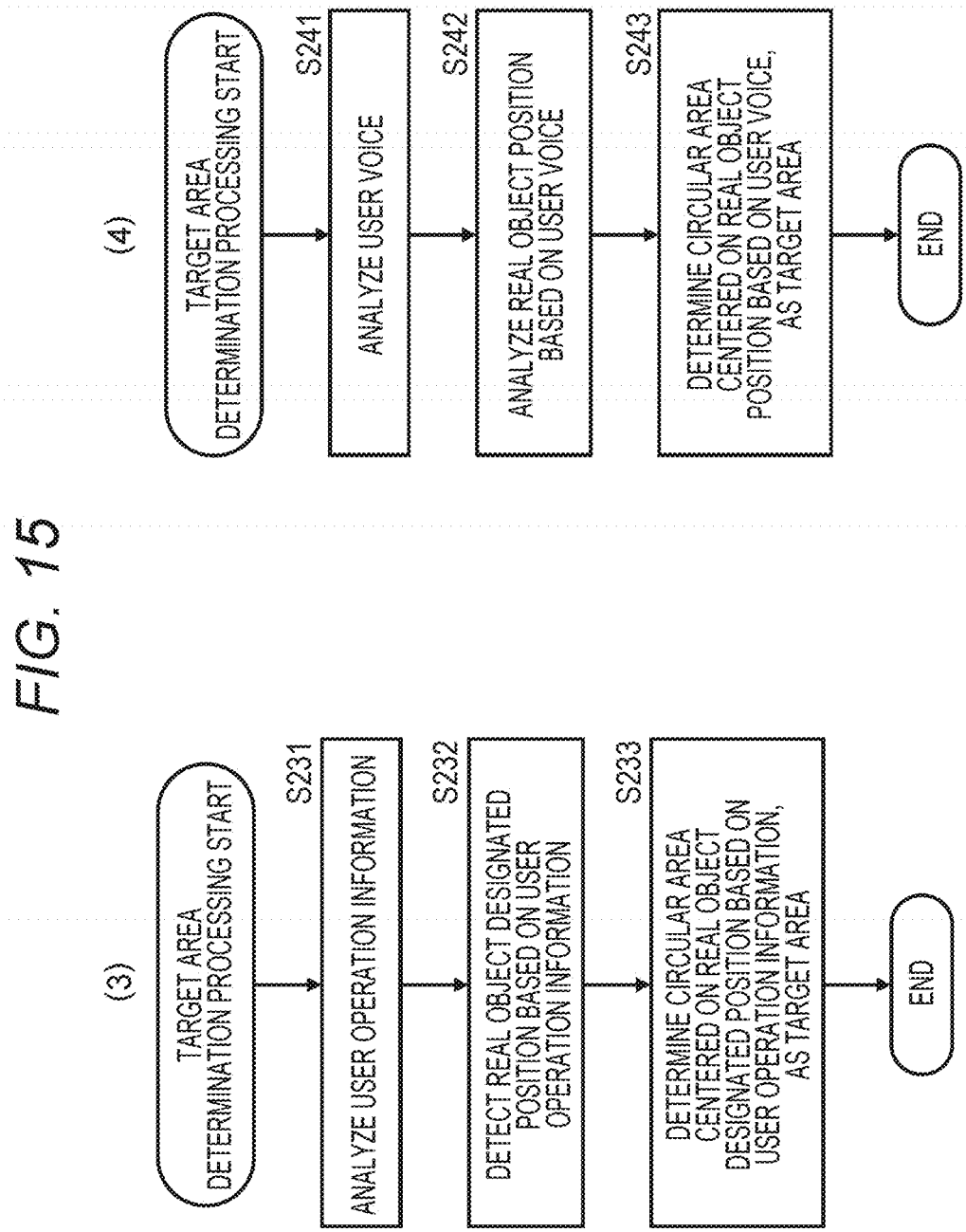
FIG. 15 is a diagram illustrating a flowchart explaining a sequence of target area determination processing executed by the image processing apparatus of the present disclosure.

FIG. 15(3) illustrates a target area determination sequence based on an analysis of user operation information. The target area determination processing based on the analysis of the user operation information is executed in the following processing sequence.

First, in step S231, the user operation information is analyzed. For example, the user operation is touch operation on the smartphone described earlier with reference to FIG. 6.

Next, in step S232, a real object designated position based on the user operation information is detected. This processing is executed as, for example, detection processing of a user's finger contact position.

Finally, in step S233, a circular area centered on the real object designated position based on the user operation information is determined as the target area.

Note that, as described above, the shape and size of the target area can be variously set.

FIG. 15(4) illustrates a target area determination sequence based on an analysis of user voice information. The target area determination processing based on the analysis of the user voice information is executed in the following processing sequence.

First, in step S241, a user utterance voice is analyzed. For example, the user utterance voice such as "pond in front" is analyzed.

Next, in step S242, a real object designated position based on the user voice information is detected.

Finally, in step S243, a circular area centered on the real object designated position based on the user utterance voice is determined as the target area.

Note that, as described above, the shape and size of the target area can be variously set.

In addition to the description with reference to FIGS. 14 and 15, for example, the following target area determination processing may be performed.

(a) Target area determination processing using posture and movement information of the image processing apparatus 100 main body analyzed by the device posture analysis unit 124.

(b) Processing of executing detection processing of a horizontal surface such as a ground surface, a floor surface, or a water surface on the basis of a three-dimensional map generated on the basis of an image captured by the external imaging camera 111 or detection information from the motion sensor 113, and determining, as the target area, an area of the horizontal surface closest to the center area of the captured image.

(c) Processing in which the user performs an operation of throwing a virtual ball, an image of the virtual ball is captured by the external imaging camera 111, a landing point of the ball is analyzed by analyzing the captured image, and the landing point is determined as the center position of the target area.

(d) In addition, processing of analyzing at least any one of a user action, a user line-of-sight, a user operation, a user position, or a user posture, and determining the target area on the basis of an analysis result.

Returning to the flow illustrated in FIG. 13, the description will be continued.

As described above, the object identification unit 126 of the data processing unit 120 of the image processing apparatus 100 executes the target area determination processing in step S104.

(Step S105)

Next, in step S105, the data processing unit identifies the real object in the target area.

Specifically, object identification processing is executed, such as that the target area is a pond, a tree, or the like.

As described above, the object identification processing of the real object is executed by applying the semantic segmentation processing, for example.

The semantic segmentation is a technology of identifying which object category each of constituent pixels (pixels) of an image belongs to, on the basis of a matching degree between, for example, dictionary data (learned data) for object identification in which shape information and other feature information of various actual objects are registered and, for example, an object in a camera-captured image.

Note that, the identification processing of the real object executed by the object identification unit 126 is executed for only the target area or only a limited range of a surrounding area including the target area. By performing such processing in a limited range, high-speed processing, that is, real-time processing can be performed.

The result of identification of the real object in the target area analyzed by the object identification unit 126 is input to the content display control unit 131 and the content sound control unit 132 of the data output unit 130.

(Step S106)

Next, in step S106, a type and an output mode of a virtual object to be displayed in the target area are determined on the basis of the identified real object (class) in the target area.

This processing is processing executed by the content display control unit 131 and the content sound control unit 132 of the data output unit 130 of the image processing apparatus 100 illustrated in FIG. 9.

The content display control unit 131 and the content sound control unit 132 of the data output unit 130 refers to the class-associated virtual object data 135 in which the data described earlier with reference to FIG. 12 is recorded, to determine the type and the output mode of the virtual object to be displayed in the target area.

That is, processing and the like is executed of selecting an entry in which the real object type (class) in the target area is recorded from each entry of the class-associated virtual object data 135 and determining the fancy-dress object recorded in the entry as the output object.

(Step S107)

Finally, in step S107, the virtual object is output (displayed) to the target area in accordance with the type and the output mode of the virtual object to be displayed in the target area determined in step S106.

This processing is also processing executed by the content display control unit 131 and the content sound control unit 132 of the data output unit 130 of the image processing apparatus 100 illustrated in FIG. 9.

The content display control unit 131 inputs an object identification result for the target area from the object identification unit 126, determines selection processing and a display mode of a virtual object (character or the like) to be displayed in accordance with the object identification result, and displays the virtual object on the display unit 133.

Specifically, the display processing is executed of the virtual object (character or the like) as illustrated in FIGS. 2 to 4, 7, and 8 described earlier, for example.

Furthermore, the content sound control unit 132 inputs the object identification result for the target area from the object identification unit 126, determines a sound to be output in accordance with the object identification result, and outputs the sound via the speaker 134.

Specifically, for example, as illustrated in FIG. 7 described earlier, in a case where a virtual object appears from a pond that is a real object, processing of outputting a sound of water is executed.

(3-(2) Sequence of Processing of Setting Set Area of Target Area in Substantially Horizontal Surface)

Next, with reference to a flowchart illustrated in FIG. 16, a sequence will be described of processing of setting a set area of the target area in a substantially horizontal surface.

In a case where a virtual object such as a character is displayed on a real object in the real world, if the virtual object is displayed on the ground surface if the real object is in the outdoors, and on the floor if the real object is indoors, more natural character display becomes possible, and it becomes possible to give the user a sense that the character actually exists in the real world.

For this purpose, it is effective to perform control to set the target area to be an output area of the virtual object that is the character, in a substantially horizontal surface such as on the ground surface or on the floor.

Figure 16:
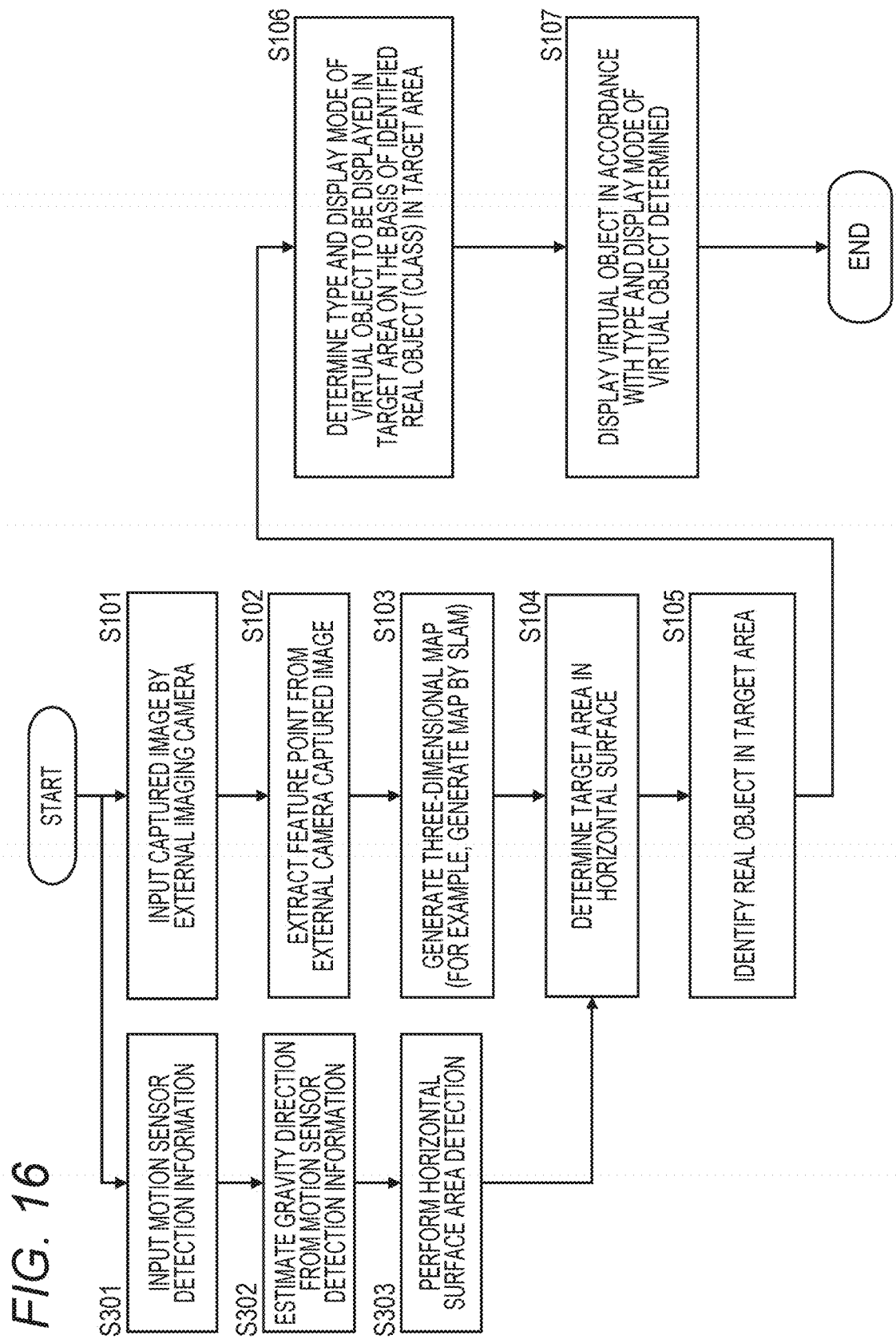
FIG. 16 is a diagram illustrating a flowchart explaining a sequence of processing executed by the image processing apparatus of the present disclosure.

The flowchart illustrated in FIG. 16 is a flowchart explaining a processing sequence of the image processing apparatus 100 that executes such processing.

Hereinafter, processing will be described of each step of the flowchart illustrated in FIG. 16.

Note that, the processing of steps S101 to S103 and steps S105 to S107 of the flowchart illustrated in FIG. 16 is processing similar to the processing of a corresponding step of the basic processing flow described earlier with reference to FIG. 13.

The processing in steps S301 to S303 and the processing in step S104 of a flow illustrated in FIG. 16 are points different from the flow illustrated in FIG. 13 described earlier.

The processing of each step will be described.

(Step S301)

Step S301 is processing of inputting the sensor detection information from the motion sensor 113 of the data input unit 110 of the image processing apparatus 100 illustrated in FIG. 9 to the device posture analysis unit 124 of the data processing unit 120.

As described earlier with reference to FIG. 9, the motion sensor 113 includes a gyro, an acceleration sensor, and the like, and is a sensor that detects the posture and movement of the image processing apparatus 100 main body, for example, an HMD or a smartphone.

The sensor detection information is input from the motion sensor 113 to the device posture analysis unit 124 of the data processing unit 120.

(Step S302)

Next, in step S302, a gravity direction is estimated on the basis of motion sensor detection information.

This processing is processing executed by the device posture analysis unit 124 of the data processing unit 120 illustrated in FIG. 9.

The device posture analysis unit 124 of the data processing unit 120 calculates the gravity direction by using the sensor detection information from a gyro, an acceleration sensor, and the like constituting the motion sensor 113.

(Step S303)

Next, in step S303, detection processing of a horizontal surface area is performed.

This processing is processing executed by the object identification unit 126 illustrated in FIG. 9.

The object identification unit 126 detects the horizontal surface area in the three-dimensional map by using the three-dimensional map generated by the three-dimensional map generation unit 122 and gravity direction information input from the device posture analysis unit 124. Specifically, for example, the ground surface, the floor surface, or the like is detected.

Note that, the horizontal surface area to be detected is not limited to a complete horizontal surface, and is only required to be a substantially horizontal area.

For example, a certain degree of unevenness, a slope having a certain degree of gradient, or the like is also determined and detected as the horizontal surface area.

It is possible to set in advance how much unevenness or inclination is allowed as the horizontal surface area.

(Step S104)

Next, in step S104, the data processing unit executes target area determination processing.

However, in the present processing example, the target area is selected only from the horizontal surface area detected in step S303.

This processing is processing executed by the object identification unit 126 of the data processing unit 120 illustrated in FIG. 9.

The object identification unit 126 determines the target area to be the virtual object display area only within the horizontal surface area detected in step S303.

As described above, various methods can be applied to the target area determination processing.

For example, it can be performed by using an image of the user's finger included in the three-dimensional map.

That is, an intersection is obtained between the extension line in the pointing direction of the user and the horizontal surface area that is the real object on the three-dimensional map and is determined to be the horizontal surface such as the ground surface or the floor surface, and a circular area having a predefined radius centered on the intersection with the horizontal surface is determined as the target area.

Note that, as the data used to determine the target area, various types of information can be used as described earlier with reference to FIG. 13. For example, the following input information may be used.

(a) User line-of-sight information analyzed by the internally-captured image analysis unit 123

(b) Posture and movement information of the image processing apparatus 100 main body analyzed by the device posture analysis unit 124

(c) User operation information input via the operation unit 114

(d) User voice information analyzed by the sound analysis unit 125

For example, the target area may be determined by using any of these pieces of input information.

The processing in steps S101 to S103 and the processing of step S105 and subsequent steps are similar to the processing in the flowchart illustrated in FIG. 13 described earlier.

In the present processing example, it becomes possible to perform control to set the target area to be the output area of the virtual object that is the character, in the substantially horizontal surface such as on the ground surface or on the floor.

As a result, in a case where a virtual object such as a character is displayed on a real object in the real world, display becomes possible so that the virtual object is in contact with the horizontal surface area, such as on the ground surface if the real object is outdoors or on the floor if the real object is indoors, and more natural character display becomes possible, and it becomes possible to give the user a sense that the character actually exists in the real world.

(3-(3) Update Sequence for Real Object Identification Processing)

Next, a description will be given of an update sequence for the real object identification processing executed by the object identification unit.

As described earlier with reference to FIGS. 10, 11, and the like, the object identification unit 126 in the data processing unit 120 of the image processing apparatus 100 illustrated in FIG. 9 executes the identification processing of the real object in the target area immediately after the target area is determined, and thereafter, repeatedly executes the object identification processing for the area and sequentially updates the spatial map data illustrated in FIG. 10.

However, an interval of the update processing varies depending on a type (class) of the identified real object.

Specified data of update times different depending on the type (class) of the real object is registered in advance as the class-associated update time data 128.

The class-associated update time data 128 is data in which the following pieces of data are associated with each other as described earlier with reference to FIG. 11.

(a) ID (b) Category (c) Class (d) Update time (sec)

The (a) ID is an identifier of registered data.

The (b) category is a category of a type (class) of the real object.

The (c) class is type information of the real object.

The (d) update time (sec) is a time indicating an update interval of the real object identification processing.

For example, in a case of the class (object type) of ID001=lawn, the update time is 3600 sec (=1 hour). In an object such as the lawn, a change with a lapse of time is small, and the update time is set to be long.

On the other hand, for example, in a case of the class (object type) of ID=004=shadow, the update time is 2 sec. In an object such as the shadow, a change with a lapse of time is large, so that the update time is set to be short.

The object identification unit 126 refers to the data of the class-associated update time data 128, and repeatedly executes the object identification processing at a time interval defined for the identified object as needed. Real objects detected by new identification processing are sequentially registered as the spatial map data 127 described with reference to FIG. 10.

A flowchart illustrated in FIG. 17 is a flowchart explaining processing including a repeated execution sequence of the object identification processing.

Hereinafter, processing will be described of each step of the flowchart illustrated in FIG. 17.

Note that, the processing of steps S101 to S105 and the processing of steps S106 to S107 of the flowchart illustrated in FIG. 17 are similar to the processing of each step of the basic processing flow described earlier with reference to FIG. 13.

The processing in steps S401 and S402 of a flow illustrated in FIG. 17 is a different point from the flow illustrated in FIG. 13 described earlier.

The processing of each step will be described.

(Step S401)

In steps S101 to S105, the determination of the target area and the identification processing of the real object (class) of the target area are executed, and then the processing of step S401 is executed.

In step S401, a result of object identification processing for the target area executed in step S105 is recorded in the spatial map data.

As described earlier with reference to FIG. 10, the spatial map data stores associated data of each of the following data.

(a) Time stamp (sec)
(b) Position information
(c) Class
(d) Elapsed time after identification processing (sec)

The (a) time stamp (sec) is time information on execution of the object identification processing.

The (b) position information is position information of a real object that is an object identification target.

The (c) class is object type information as an object identification result.

The (d) elapsed time after identification processing (sec) is an elapsed time from completion of the object identification processing.

In step S401, for the real object in the target area identified in step S105, these pieces of data are registered in the spatial map data.

(Steps S106 to S107)

The processing of steps S106 to S107 is similar to the processing described earlier with reference to FIG. 13. That is, the following processing is executed.

In step S106, the type and the output mode of the virtual object to be displayed in the target area are determined on the basis of the identified real object (class) in the target area.

In step S107, the virtual object is output (displayed) to the target area in accordance with the type and the output mode of the virtual object to be displayed in the target area determined in step S106.

(Step S402)

Moreover, after the processing of step S107, in step S402, it is determined whether or not an elapsed time after the identification processing of the real object in the target area executed in step S105 exceeds the "(d) update time" defined in the class-associated update time data described with reference to FIG. 11.

In a case where it is determined that the elapsed time exceeds the update time, the processing returns to step S101, and the processing of step S101 and subsequent steps is repeatedly executed.

That is, the determination of the target area and the real object identification processing for the target area are executed again.

In this processing, if the position of the target area has not been changed, the real object identification is executed again in the target area at the same position.

On the other hand, if the position of the target area has been changed, the real object identification is executed in the target area at a new position.

By performing these types of processing, it becomes possible to immediately perform the processing of updating the target area and the processing of updating the result of identification of the real object, and it becomes possible to perform timely virtual object display processing according to the movement or the instruction of the user.

[4. Hardware Configuration Example of Image Processing Apparatus]

Next, with reference to FIG. 18, a hardware configuration example will be described of the image processing apparatus that executes the processing according to the above-described embodiment.

Hardware illustrated in FIG. 18 is an example of a hardware configuration of the image processing apparatus 100 of the present disclosure described with reference to FIG. 9.

The hardware configuration illustrated in FIG. 18 will be described.

A central processing unit (CPU) 301 functions as a data processing unit that executes various types of processing in accordance with a program stored in read only memory (ROM) 302 or a storage unit 308. For example, the processing is executed according to the sequence described in the above-described embodiments. Random Access Memory (RAM) 303 stores the program executed by the CPU 301, data, and the like. These CPU 301, ROM 302, and RAM 303 are connected to each other by a bus 304.

The CPU 301 is connected to an input/output interface 305 via the bus 304, and the input/output interface 305 is connected to: an input unit 306 including various sensors, a camera, a switch, a keyboard, a mouse, a microphone, and the like; and an output unit 307 including a display, a speaker, and the like.

The storage unit 308 connected to the input/output interface 305 includes, for example, a hard disk or the like, and stores the program executed by the CPU 301 and various data. The communication unit 309 functions as a data communication transmission/reception unit via a network such as the Internet or a local area network, and further a transmission/reception unit for broadcast waves, and communicates with an external apparatus.

A drive 310 connected to the input/output interface 305 drives a removable medium 311 such as a magnetic disk, an optical disk, a magneto-optical disk, or a semiconductor memory such as a memory card, and executes data recording or reading.

[5. Summary of Configuration of Present Disclosure]

In the above, the embodiments of the present disclosure have been described in detail with reference to specific embodiments. However, it is self-evident that those skilled in the art can make modifications and substitutions of the embodiments without departing from the gist of the present disclosure. In other words, the present invention has been disclosed in the form of exemplification, and should not be interpreted restrictively. To determine the gist of the present disclosure, the scope of claims should be taken into consideration.

Note that, the technology disclosed in this specification can have the following configuration.

(1) An image processing apparatus including:
an object identification unit that executes identification processing of a real object in a real world; and
a content display control unit that generates an augmented reality (AR) image in which a real object and a virtual object are superimposed and displayed, in which
the object identification unit
executes object identification processing of identifying a real object in a display area for the virtual object, and
the content display control unit
selects a virtual object to be displayed depending on an object identification result identified in the object identification unit.

(2) The image processing apparatus according to (1), in which
the object identification unit
executes object identification processing by image recognition processing.

(3) The image processing apparatus according to (2), in which
the object identification unit
executes object identification processing by applying semantic segmentation processing.

(4) The image processing apparatus according to any of (1) to (3), in which
the object identification unit
determines a target area to be a display area for the virtual object, and executes identification processing of a real object in the target area determined.

(5) The image processing apparatus according to (4), in which
the object identification unit
determines the target area on the basis of at least any one of a user action, a user line-of-sight, a user operation, a user position, or a user posture.

(6) The image processing apparatus according to (4) or (5), in which
the object identification unit
selects and determines the target area from a horizontal surface area.

(7) The image processing apparatus according to (6), in which
the content display control unit
displays the virtual object such that the virtual object is in contact with the horizontal surface area.

(8) The image processing apparatus according to (1) to (7), in which
the object identification unit
executes the object identification processing as real-time processing.

(9) The image processing apparatus according to any of (1) to (8), in which
the object identification unit
repeatedly executes object identification processing at a time interval defined in advance depending on an object type.

(10) The image processing apparatus according to any of (1) to (9), further including
a three-dimensional map generation unit that generates a three-dimensional map of the real world based on a camera-captured image, in which
the object identification unit
determines a target area to be a display area for the virtual object by using the three-dimensional map.

(11) The image processing apparatus according to (10), in which
the three-dimensional map generation unit
generates a three-dimensional map of the real world by simultaneous localization and mapping (SLAM) processing.

(12) The image processing apparatus according to any of (1) to (11), in which
the content display control unit
selects a virtual object to be displayed depending on an object identification result identified in the object identification unit, and
also controls a display mode of the virtual object to be displayed depending on the object identification result.

(13) The image processing apparatus according to any of (1) to (12), further including
a content sound control unit that executes sound output control, in which
the content sound control unit
determines and outputs a sound to be output depending on an object identification result identified in the object identification unit.

(14) An image processing method executed in an image processing apparatus, the method including:
executing, by an object identification unit, an object identification processing step of executing identification processing of a real object in a real world; and
executing, by a content display control unit, a content display control step of generating an augmented reality (AR) image in which a real object and a virtual object are superimposed and displayed, in which
the object identification processing step
is a step of executing object identification processing of identifying a real object in a display area for the virtual object, and
the content display control step
executes a step of selecting a virtual object to be displayed depending on an object identification result identified in the object identification processing step.

(15) A program for causing image processing to be executed in an image processing apparatus, the program:
causing an object identification unit to execute an object identification processing step of executing identification processing of a real object in a real world;
causing a content display control unit to execute a content display control step of generating an augmented reality (AR) image in which a real object and a virtual object are superimposed and displayed;

in the object identification processing step,
causing object identification processing to be executed, the object identification processing identifying a real object in a display area for the virtual object; and
in the content display control step,
causing a step to be executed, the step selecting a virtual object to be displayed depending on an object identification result identified in the object identification processing step.

Furthermore, the series of processing steps described in the specification can be executed by hardware, software, or a combination of both. In the case of executing processing by software, it is possible to install and execute a program recording the processing sequence in a memory in a computer incorporated in dedicated hardware, or to install and execute the program in a general-purpose computer capable of executing various types of processing. For example, the program can be recorded in a recording medium in advance. In addition to installing from the recording medium to the computer, the program can be received via a network such as a local area network (LAN) or the Internet, and installed in the recording medium such as a built-in hard disk.

Note that, the various types of processing described in the specification are not only executed in chronological order in accordance with the description but also may be executed in parallel or individually depending on the processing capability of the apparatus that executes the processing or depending on necessity. Furthermore, in this specification, the term "system" is a logical group configuration of a plurality of apparatuses, and is not limited to the one in which the apparatuses of each configuration are in the same housing.

INDUSTRIAL APPLICABILITY

As described above, according to a configuration of an embodiment of the present disclosure, an apparatus and a method are implemented that performs selection or display mode change of a virtual object to be displayed depending on a real object type in a target area to be a display area for the virtual object.

Specifically, for example, included are the object identification unit that executes identification processing of the real object in the real world, and the content display control unit that generates the AR image in which the real object and the virtual object are superimposed and displayed. The object identification unit identifies a real object in the target area to be the display area for the virtual object, and the content display control unit performs processing of selecting the virtual object to be displayed or processing of changing the display mode depending on the object identification result.

With this configuration, an apparatus and a method are implemented that performs selection or display mode change of a virtual object to be displayed depending on a real object type in a target area to be a display area for the virtual object.

REFERENCE SIGNS LIST

10 Light transmission type AR image display device
11 Target area
21 Transmission observation image
22 to 24 Virtual object image
30 Camera-captured image display type AR image display device
31 Camera
32 Camera-captured image
40 Smartphone
41 Camera
42 Camera-captured image
50 Virtual object image on the water
51 Virtual object image in the water
52 Virtual object image
53, 54 Virtual object shadow image
100 Image processing apparatus
110 Data input unit
111 External imaging camera
112 Internal imaging camera
113 Motion sensor (gyro, acceleration sensor, and the like)
114 Operation unit
115 Microphone
120 Data processing unit
121 Externally-captured image analysis unit
122 Three-dimensional map generation unit
123 Internally-captured image analysis unit
124 Device posture analysis unit
125 Sound analysis unit
126 Object identification unit
127 Spatial map data
128 Class-associated update time data
130 Data output unit
131 Content display control unit
132 Content sound control unit
133 Display unit
134 Speaker
135 Class-associated virtual object data (3D model, sound data, and the like)
140 Communication unit
301 CPU
302 ROM
303 RAM
304 Bus
305 Input/output interface
306 Input unit
307 Output unit
308 Storage unit
309 Communication unit
310 Drive
311 Removable medium

The invention claimed is:
1. An image processing apparatus comprising:
an object identification unit configured to execute identification processing of a real object in a real world; and
a content display control unit configured to generate an image in which the real object and a virtual object are superimposed,
wherein the object identification unit executes the identification processing including object identification processing of identifying the real object in a display area for the virtual object,
wherein the content display control unit selects the virtual object to be displayed depending on an object identification result identified in the object identification unit,
wherein the virtual object is displayed in a case where the display area for the virtual object is pointed based on user operation information input via an operation unit,
wherein the operation unit includes a bar-shaped member separated from the image processing apparatus, and
wherein the object identification unit and the content display control unit are each implemented via at least one processor.

2. The image processing apparatus according to claim 1, wherein the object identification unit executes object identification processing by image recognition processing.

3. The image processing apparatus according to claim 2, wherein the object identification unit executes object identification processing by applying semantic segmentation processing.

4. The image processing apparatus according to claim 1, wherein the object identification unit
   determines a target area to be a display area for the virtual object, and
   executes identification processing of a real object in the target area determined.

5. The image processing apparatus according to claim 4, wherein the object identification unit determines the target area on a basis of at least any one of a user action, a user line-of-sight, a user operation, a user position, or a user posture.

6. The image processing apparatus according to claim 4, wherein the object identification unit selects and determines the target area from a horizontal surface area.

7. The image processing apparatus according to claim 6, wherein the content display control unit displays the virtual object such that the virtual object is in contact with the horizontal surface area.

8. The image processing apparatus according to claim 4, wherein the object identification unit executes the object identification processing as real-time processing.

9. The image processing apparatus according to claim 1, wherein the object identification unit repeatedly executes object identification processing at a time interval defined in advance depending on an object type.

10. The image processing apparatus according to claim 1, further comprising:
    a three-dimensional map generation unit configured to generate a three-dimensional map of the real world based on a camera-captured image,
    wherein the object identification unit determines a target area to be a display area for the virtual object by using the three-dimensional map, and
    wherein the three-dimensional map generation unit is implemented via at least one processor.

11. The image processing apparatus according to claim 10,
    wherein the three-dimensional map generation unit generates a three-dimensional map of the real world by simultaneous localization and mapping (SLAM) processing.

12. The image processing apparatus according to claim 1, wherein the content display control unit controls a display mode of the virtual object to be displayed depending on the object identification result.

13. The image processing apparatus according to claim 1, further comprising:
    a content sound control unit configured to execute sound output control,
    wherein the content sound control unit determines and outputs a sound to be output depending on an object identification result identified in the object identification unit, and
    wherein the content sound control unit is implemented via at least one processor.

14. An image processing method, executed by at least one processor of an image processing apparatus, the method comprising:
    executing identification processing of a real object in a real world; and
    generating an image in which the real object and a virtual object are superimposed,
    wherein the executed identification processing includes executing object identification processing of identifying the real object in a display area for the virtual object,
    wherein the virtual object to be displayed is selected depending on an object identification result identified by the object identification processing,
    wherein the virtual object is displayed in a case where the display area for the virtual object is pointed based on user operation information input via an operation unit, and
    wherein the operation unit includes a bar-shaped member separated from the image processing apparatus.

15. A non-transitory computer-readable storage medium having embodied thereon a program, which when executed by a computer causes the computer to execute an image processing method in an image processing apparatus of the computer, the image processing method comprising:
    executing identification processing of a real object in a real world; and
    generating an image in which the real object and a virtual object are superimposed,
    wherein the executed identification processing includes causing object identification processing to be executed, the object identification processing identifying the real object in a display area for the virtual object,
    a wherein the virtual object to be displayed is selected depending on an object identification result identified by the object identification processing,
    wherein the virtual object is displayed in a case where the display area for the virtual object is pointed based on user operation information input via an operation unit, and
    wherein the operation unit includes a bar-shaped member separated from the image processing apparatus.

* * * * *